US010119714B2

(12) United States Patent
Amer et al.

(10) Patent No.: US 10,119,714 B2
(45) Date of Patent: Nov. 6, 2018

(54) SYSTEM AND METHOD FOR REMOTELY CONTROLLING IR-ENABLED APPLIANCES VIA NETWORKED DEVICE

(71) Applicant: Cielo WiGle Inc., Redmond, WA (US)

(72) Inventors: Waseem Amer, Islamabad (PK); Anees Ahmed Jarral, Islamabad (PK)

(73) Assignee: Cielo WiGle Inc., Redmond, WA (US)

( * ) Notice: Subject to any disclaimer, the term of this patent is extended or adjusted under 35 U.S.C. 154(b) by 234 days.

(21) Appl. No.: 14/849,020

(22) Filed: Sep. 9, 2015

(65) Prior Publication Data

US 2016/0072638 A1   Mar. 10, 2016

Related U.S. Application Data

(60) Provisional application No. 62/048,275, filed on Sep. 10, 2014.

(51) Int. Cl.
*H04B 10/00*   (2013.01)
*F24F 11/00*   (2018.01)
(Continued)

(52) U.S. Cl.
CPC ............ *F24F 11/006* (2013.01); *F24F 11/30* (2018.01); *F24F 11/62* (2018.01); *G05B 19/042* (2013.01); *G08C 23/04* (2013.01); *H04L 12/283* (2013.01); *H04L 12/2807* (2013.01); *H04L 12/2818* (2013.01); *H04L 67/1002* (2013.01); *H04L 67/125* (2013.01); *H04W 4/70* (2018.02); *F24F 11/58* (2018.01); *G05B 2219/2642* (2013.01); *H04L 2012/285* (2013.01);
(Continued)

(58) Field of Classification Search
CPC .. F24F 11/006; F24F 2011/0071; F24F 11/58; G05B 19/042; G05B 2219/2642; G08C 23/04; G08C 2201/21; H04L 12/2807; H04L 12/2818; H04L 12/283; H04L 2012/2841; H04L 2012/285; H04L 67/1002; H04L 67/125; H04W 4/005; H04W 4/70; Y02B 60/46; Y02B 60/50; H04B 10/114; H04B 10/1143; H04B 10/22; H03J 9/06; G01S 17/74; F41G 3/2655; F41G 3/2683; G05D 1/0242; Y02D 70/168; Y02D 70/26; Y02D 70/142; Y02D 70/22; Y02D 70/21; Y02D 70/164; Y02D 70/162; Y02D 30/40
USPC ................................ 398/106, 107, 108, 109
See application file for complete search history.

(56) References Cited

U.S. PATENT DOCUMENTS

| | | | | |
|---|---|---|---|---|
| 2005/0200705 A1* | 9/2005 | Nieto | ................. | H04N 5/23203 348/207.99 |
| 2012/0271460 A1* | 10/2012 | Rognli | ............... | G05D 23/1934 700/276 |
| 2013/0107131 A1* | 5/2013 | Barnett | ................. | G08C 17/02 348/734 |

* cited by examiner

*Primary Examiner* — M. R. Sedighian
(74) *Attorney, Agent, or Firm* — Galvin Patent Law LLC; Brian R. Galvin

(57) ABSTRACT

Systems and methods for remotely controlling infrared ("IR") enabled appliances via a networked device are described. The technology enables one or multiple users to control, monitor, and manage their appliances (e.g., air conditioners, television sets, multimedia systems, window curtains, etc.) both locally and remotely, irrespective of the users' location or their line of sight. In various embodiments, the technology includes a device with integrated Wi-Fi and IR subsystems connected via a cloud platform to a user application interface that can control appliances, generate analytics, schedule automatic operation, and perform smart learning operation.

13 Claims, 41 Drawing Sheets

(51) Int. Cl.
*F24F 11/30* (2018.01)
*F24F 11/62* (2018.01)
*H04L 12/28* (2006.01)
*G08C 23/04* (2006.01)
*H04L 29/08* (2006.01)
*G05B 19/042* (2006.01)
*H04W 4/70* (2018.01)
*F24F 11/58* (2018.01)

(52) U.S. Cl.
CPC ...... *H04L 2012/2841* (2013.01); *Y02D 30/40* (2018.01); *Y02D 70/142* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/26* (2018.01)

change reference numbers to not conflict

*FIG. 17A*

SYSTEM AND METHOD FOR REMOTELY CONTROLLING IR-ENABLED APPLIANCES VIA NETWORKED DEVICE

CROSS-REFERENCE TO RELATED APPLICATIONS

This application claims the benefit of U.S. Provisional Patent Application No. 62/048,275, entitled "Cloud enabled Smart Device to Harness IR enabled Brand Independent Electric Appliances," filed Sep. 10, 2014, which is hereby incorporated by reference in its entirety.

TECHNICAL FIELD

The present disclosure relates to Machine to Machine ("M2M") communication technology and the Internet of Things ("IoT") industry.

BACKGROUND

Consumers in today's world have multiple infrared ("IR") enabled appliances both at their homes and offices, such as air conditioners, television sets, multimedia systems, stereo systems, window curtains, fireplaces, etc. These appliances can normally be remotely controlled by an IR remote control provided with the appliance by the manufacturer. These IR remote controls relay user commands to the appliances for appropriate actions.

BRIEF DESCRIPTION OF THE DRAWINGS

FIGS. 5A-5J are high-level schematic diagrams illustrating communication arrangements through which local and/or remote users can control appliances in various embodiments of the technology.

FIGS. 17A-17B are display diagrams illustrating appliance scheduling in accordance with some embodiments of the technology.

DETAILED DESCRIPTION

Overview

Figure 1A:
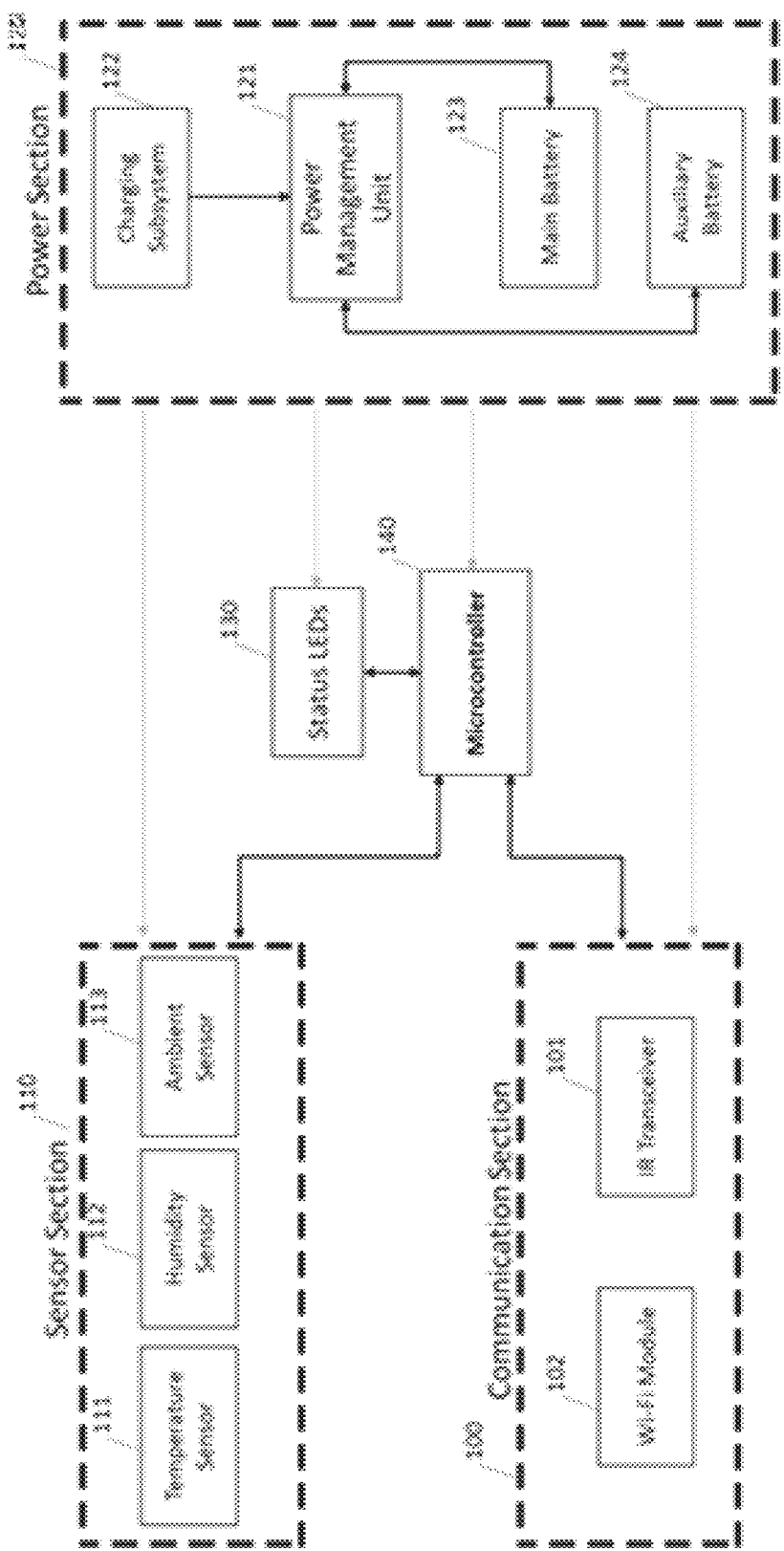
FIGS. 1A-1D are block diagrams showing some of the components typically incorporated in at least some of the computer systems and other devices on which the technology executes.

The inventors have recognized various drawbacks of conventional IR remote controls in the context of today's connected world where users demand more convenience and ease of use irrespective of their location. A conventional IR remote control normally must be in the line of sight to an appliance and pointed directly at the appliance for the user to remotely control the appliance; this limits the field of view and distance (usually only within the same room) from where an electric appliance can be controlled.

In addition, as the number of IR-enabled appliances grows in today's home or office buildings, the number of remote controls increases as well. Users conventionally have to learn the features of multiple remote controls and use device-specific remote controls to manage each device, which adds inconvenience to the users.

Furthermore, if the IR remote control of any appliance malfunctions or is misplaced, it becomes very inconvenient for the user to appropriately control the appliance with the user's choice of commands. For example, if the remote control of a wall-mounted air conditioner malfunctions, there remains hardly any choice but to get the remote control back in proper functional condition to conveniently control the appliance.

Moreover, conventional remote controls are limited in features. They are unidirectional—a control can transmit but not receive IR commands—and an appliance cannot send feedback to the IR remote. The remote controls typically do not offer conveniences such as low battery warning signs or an easy way of locating and using the remote control at night if the light level in the room is very low. IR remote controls mostly offer non-intuitive control schemes; an undesired press of a button may take the appliance to undesired state, adding more inconvenience to the user.

Electric appliances operated by conventional IR remote controls typically do not offer any means of location-independent remote control to the user. Similarly, conventionally controlled appliances do not offer intelligent analytics that can be used as a source to best utilize such appliances for optimal energy efficiency and analysis of user trends.

Conventional approaches to address some of these drawbacks have been unsatisfactory. For example, "universal" IR remote controls attempt to reduce the user hassle of dealing with multiple IR remote controls. Most of such universal remote controls claim to control multiple IR-enabled electric appliances, such as multiple audio-visual ("AV") components, through one remote control. However, conventional universal IR remote controls commonly focus on AV equipment and do not offer the ability for a user to also control dissimilar appliances such as a fireplace or air conditioner. Moreover, universal IR remote controls remain tied to line-of-sight operation and thus do not offer location-independent operation to the user. Based on IR technology, universal remote controls typically map the IR technology of normal remote controls without adding any additional connectivity options or offering location independence to the user.

Recently, ZigBee mesh network technology has been used to offer location-independent remote control to the user for some appliances. However, ZigBee-based approaches to appliance control are also unsatisfactory. ZigBee technology inherently requires an additional ZigBee concentrator to act as master while communicating with end nodes that are deployed to the user's appliances. The ZigBee concentrator is further linked to a local area network ("LAN") router (e.g., an IEEE 802.11 wireless LAN ("Wi-Fi") network router) to communicate with a remote user through a cloud application (e.g., via a smartphone). The end nodes cannot through ZigBee directly link to a LAN present at the user location. ZigBee systems require the user to have an extra ZigBee communication device placed beside already existing wireless switch or Wi-Fi router in same premises as the user's IR-enabled appliances. The requirement of an additional concentrator has been a major hurdle in the success of such devices.

Conventional ZigBee approaches also have operational disadvantages. ZigBee-based devices communicate with the user through the ZigBee concentrator, a Wi-Fi router, and a cloud application. Consequently, each user command for an appliance is relayed through a six layer system (user TO cloud application TO Wi-Fi router TO ZigBee concentrator TO ZigBee device and eventually TO the appliance). Additionally, such devices conventionally do not offer onboard IR and Wi-Fi subsystems. The unavailability of these subsystems on such devices restricts the flexibility of making intelligent data transfer decisions for a reduced number of user command communication layers, which thus fails to provide minimal power consumption and fast response.

Another issue in connecting legacy IR-enabled appliances to a remote user is providing up-to-date features for existing appliances. An appliance manufacturer may implement new communication modules within new releases of their appliances; but the updated modules in new appliances cannot simultaneously offer updated features in the older, existing appliances that a consumer is already using. In addition, the newer communication module in a newer appliance typically does not offer parallel command capture of older IR remote controls and any associated user analytics.

Another approach that has been presented is the concept of using mobile telephone cellular infrastructure to provide location-independent control to users over their IR-enabled electric appliances. However, this method comes with an inherent requirement of adding a cellular interface to each appliance to be controlled. The continued additional charges of cellular interfaces connected to each device increases financial burden on the user. For example, if a user has multiple IR-enabled electric appliances and each is fitted with an additional cellular interface for communication, the user has to bear additional monthly charges for each device in addition to making wired connection of such interfaces to existing equipment. Additionally, this concept does not offer parallel command capture of a conventional IR remote control and any associated user analytics.

The inventors have recognized that the challenge remains, and a strong need exists, to enhance user convenience, seamlessly interfacing location-independent remote controlling devices to legacy as well as new appliances, using already-deployed communication infrastructure such as a Wi-Fi network at the user premises as a communication medium, and offering a simple do-it-yourself ("DIY") experience without any additional wiring efforts to the legacy and new appliances.

To address disadvantages of conventional IR remote control methods and systems, the inventors have conceived and reduced to practice technology implementable in software and/or hardware that enable the control, monitoring, and management of appliances by providing both remote and local access and control to the user ("the technology"). Devices in accordance with the technology of the present disclosure are capable of controlling a plurality of appliances through optimal placement and/or interchangeable use. In various embodiments of the technology, the same device is capable of being linked to various IR-enabled electric appliances of different types (e.g., an air conditioner, television, multimedia player, window curtains, etc.). The device sends commands wirelessly to the appliance of choice without requiring any change to the appliance's design. This innovative feature enables the technology to operate with both legacy and new appliances. Devices implementing the technology connect with cloud-based server architecture and user interfaces such as smartphone and/or web applications, increasing flexibility, improving user experience, and enabling user access to appliances irrespective of user location or their line of sight.

In various embodiments, the technology can connect directly with the user's Wi-Fi router, minimize user command communication layers, and offer multiple communication links to minimize power usage by intelligently switching between onboard communication subsystems. Devices in accordance with the technology of the present disclosure offer interchangeability of use with regards to IR-enabled electric appliances, flexibility of operation, and user analytics and trend analysis for enhanced user experience and convenience.

The technology of the present disclosure enables users to connect with, control, monitor, and manage IR-enabled consumer electronics devices such as electric appliances (as well as, e.g., other IR-enabled actuators and sensors). In various embodiments, the technology enables users to control such devices remotely by using their smart phones, tablets, or computers (e.g., via a native application or web application interface). For example, in some embodiments, the technology enables a user to control an air conditioner, bringing thermal conditions of a room within range before the user arrives there or keeping the temperature within a range to save energy.

In addition, the technology of the present disclosure includes intelligence and learning methods enabling control devices to adapt to user requirements and usage trends for better use of electric appliances and reduction in their use when not required, thus reducing energy usage of connected appliances and benefiting users economically.

By operating in some or all of the ways described above, the technology improves users' ability to control, monitor, and manage multiple IR-enabled appliances of various brands, adding some or all of flexibility, convenience, range, location independence, energy conservation, analytics, automation, and intelligent operation.

In various embodiments, devices in accordance with the disclosed technology become a connected universal remote control for a variety of equipment, allowing users to control their IR-enabled electric appliances such as air conditioners, television sets, stereo systems, window curtains, etc. from anywhere in the world. The technology provides a single solution that can address both users' existing legacy appliances and newly purchased appliances. Embodiments of the presented methods and systems make it possible to address these user needs effectively by means of a remote control and communication device in a smart IR based M2M/IoT network.

DESCRIPTION OF FIGURES

FIGS. 1A-1D are block diagrams showing some of the components typically incorporated in at least some of the computer systems and other devices on which the technology executes.

FIG. 1A illustrates components of a cloud enabled remote control device 10 in some embodiments. The illustrated components include an onboard communication section 100, sensor section 110, microcontroller unit 140, and power section 120. In the illustrated embodiment, the communication section 100 has two onboard communication subsystems: a Wi-Fi module 102 and an IR transceiver 101. For example, the device 10 can include Wi-Fi as communication media in the license-free ISM band (2.4 GHz). The Wi-Fi module 102 with implemented programs supports both direct and client mode operations. In some embodiments, the device selects the Wi-Fi operating mode depending upon, e.g., the requirement of operation and power metric indicators.

The IR transceiver 101 has onboard implementation of IR modulators and demodulators for transmission and reception of data. In some embodiments, the device 10 includes a plurality of IR transceiver elements, such as IR emitters arranged on each face of a device to ensure omnidirectional communication coverage with local appliances. The device 10 is capable of communication through onboard IR transceiver subsystem 101 with IR-enabled electric appliances such as television sets, home stereo systems, thermostats, wall air conditioners, central air conditioners, curtains, garage doors, lights, locks, etc. The device 10 can, in short, control any IR-enabled electric appliance, as the quoted examples are illustrative and not exhaustive. The IR transceiver 101 of the device 10 allows for parallel operation of legacy remote control devices of appliances.

The onboard sensor section 110 has three onboard sensors: a temperature sensor 111, a humidity sensor 112, and an ambient light sensor 113. The temperature, humidity and ambient light sensors 111-113 enable the device 10 to monitor user needs, lifestyle and habits, allowing intelligent operation to optimize and best use the IR based devices.

The illustrated device has an onboard microcontroller unit 140, e.g., with on-chip flash and random access memories. The microcontroller unit 140 has onboard communication interfaces including, for example, serial communication, a serial peripheral interface, and an Inter-Integrated Circuit ("I2C") bus for communication with the onboard subsystems. The device 10 has onboard general purpose input/output ("I/Os") and automatic data capture ("ADC") for data capture, generating triggers and commands according to loaded program instructions. The device 10 microcontroller based processing and decision making engine. The programmatic and algorithmic flows are implemented in the onboard memory and are updated by the cloud application platform as required. For example, power metric calculations are part of the onboard algorithms which help the device 10 optimal save power during its operations. the choice of multiple communication mechanisms, intelligent rules engine, algorithmic and programmatic flows and two batteries offer a prolonged life before a recharge is required in case of powerless operation option by the user. The programmatic and algorithmic flows with the help of sensory interface and onboard rules engine enable the device 10 to perform machine learning and to take intelligent decisions based on user habits.

The onboard status LEDs unit 130 provides visual status display about various modes, conditions and states of the device 10. In some embodiments, red, blue, green and yellow LEDs are used. These can indicate various statuses regarding data transfer, cloud connection, mobile application connection, main battery state, system on auxiliary battery, and others. In some embodiments a combination of two or more LEDs turned on simultaneously indicates system status for user information. In some embodiments, the device 10 includes an LCD readout (e.g., icons, segments, or a matrix display), or an LED, OLED, or other type of display screen interface.

The device 10 onboard power section 120 has an onboard charging system 122, a power management unit 121, a main battery 123, and an auxiliary battery 124. The device 10 can be charged through the charging subsystem 122. The options of main battery 123 and auxiliary battery 124 provide longer life operation in case no power outlet is available in the vicinity of installation. The device is powered through power management unit 121 to ensure optimal energy usage and reduce power losses. In some embodiments, the power management unit 121 is powered from two batteries. For example, in such embodiments the main battery 123 and an auxiliary battery 124 can be attached externally and internally, respectively. In such applications, the auxiliary battery 124 provides power backup while the main battery 123 is removed for charging or replacement. In some embodiments, the device 10 can be charged while installed at its location through the external adapter and onboard charging subsystem 122.

Figure 1B:
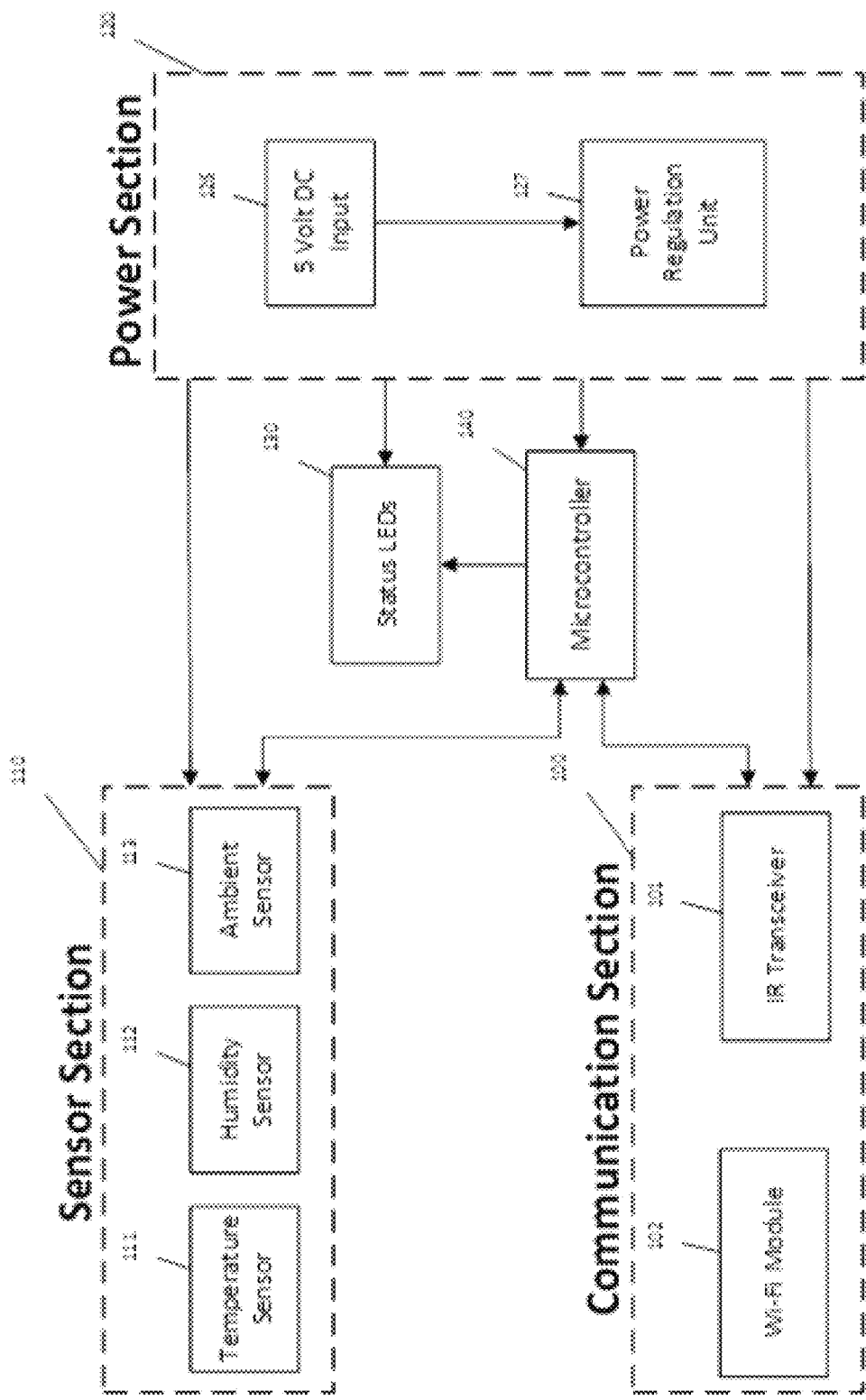

FIG. 1B illustrates some embodiments of a cloud enabled remote control device 10 containing other power section 120 components. In power section 120 of FIG. 1B, the device 10 does not include a main battery 123 or an auxiliary battery 124, but includes a 5 volt DC input 126 and a power regulation unit 127. In the illustrated embodiment, the device 10 can be operated through a 5V DC charger without needing a battery. For example, in some embodiments, the device 10 or a selection of subsystems may be embedded within an appliance to provide the control and management functionalities to the user over their appliances irrespective of user location. In such an implementation, the device 10 or its subsystems can be embedded within the appliance at the manufacturing stage or added later. Such implementation can be with batteries as shown in FIG. 1A, or without batteries as shown in FIG. 1B, putting total power dependencies on the appliance's power supply.

Figure 1C:
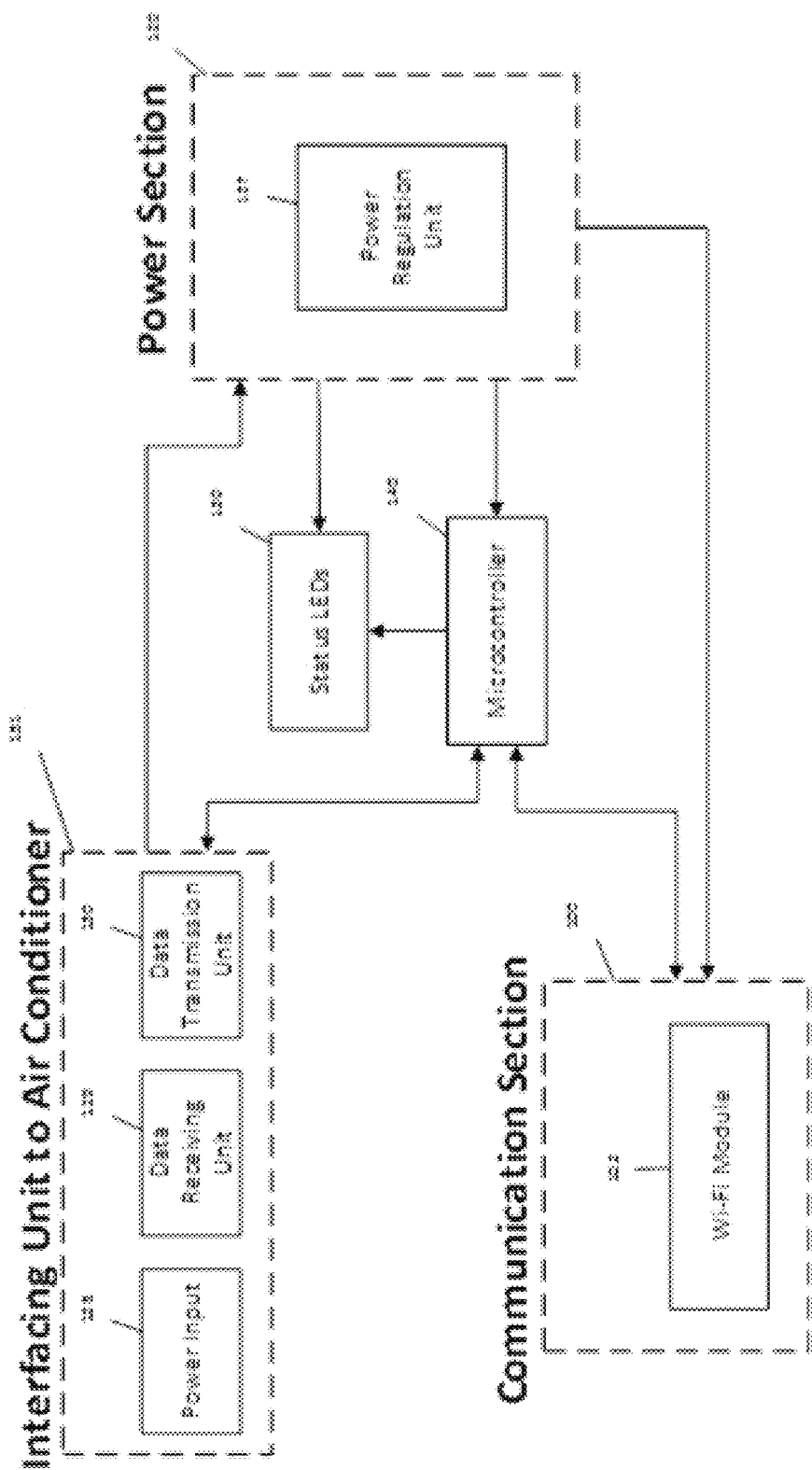

FIG. 1C illustrates some embodiments of a cloud enabled remote control device 10 fitted to (e.g., embedded internally in) an air conditioner appliance. In the illustrated embodiment, an interfacing unit 131 connects the device 10 to the air conditioner appliance. The interfacing unit 131 includes connections for power input 128, data receiving 129, and data transmission 130. The power input 128 connects the power regulation unit 127 to power through the appliance. The data receiving unit 129 and data transmission unit 130 communicate with the air conditioner appliance directly rather than through the IR transceiver of FIG. 1A.

Figure 1D:
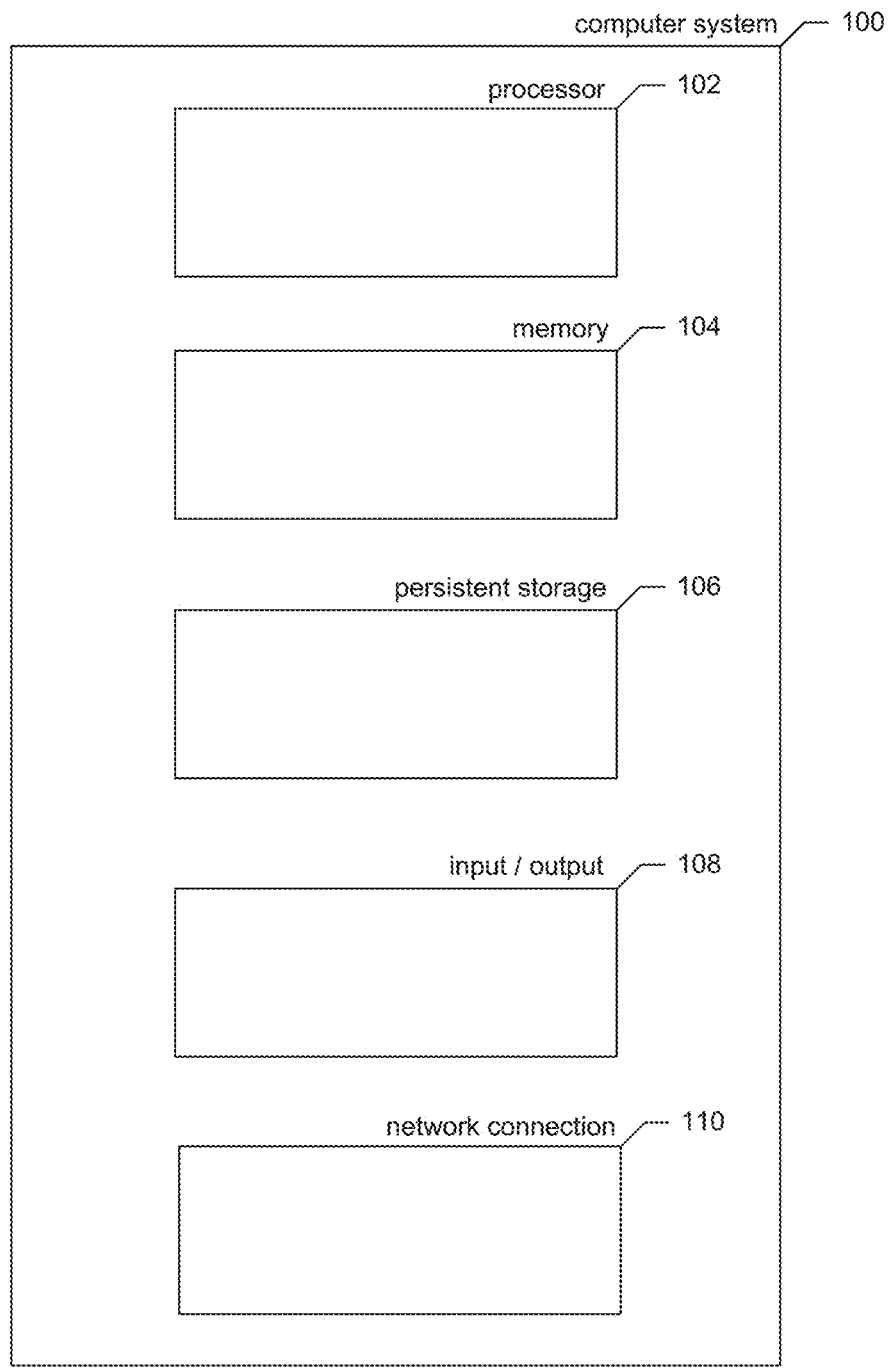

FIG. 1D is a block diagram showing some of the components typically incorporated in at least some of the computer systems and other devices on which the technology executes. These computer systems and devices 150 may include one or more central processing units ("CPUs") 151 for executing computer programs; a computer memory 152 for storing programs and data—including data structures, database tables, other data tables, etc.—while they are being used; a persistent storage device 103, such as a hard drive, for persistently storing programs and data; a computer-readable media drive 154, such as a USB flash drive, for reading programs and data stored on a computer-readable medium; and a network connection 155 for connecting the computer system to other computer systems to exchange programs and/or data—including data structures—such as via the Internet or another network and its networking hardware, such as switches, routers, repeaters, electrical cables and optical fibers, light emitters and receivers, radio transmitters and receivers, and the like. The terms "memory" and "computer-readable storage medium" include any combination of temporary and/or permanent storage, e.g., read-only memory (ROM) and writable memory (e.g., random access memory or RAM), writable non-volatile memory such as flash memory, hard drives, removable media, magnetically or optically readable discs, nanotechnology memory, synthetic biological memory, and so forth, but do not include a propagating signal per se. In various embodiments, the technology can be accessed by any suitable user interface including Web services calls to suitable APIs. While computer systems configured as described above are typically used to support the operation of the technology, one of ordinary skill in the art will appreciate that the technology may be implemented using devices of various types and configurations, and having various components.

Figure 2:
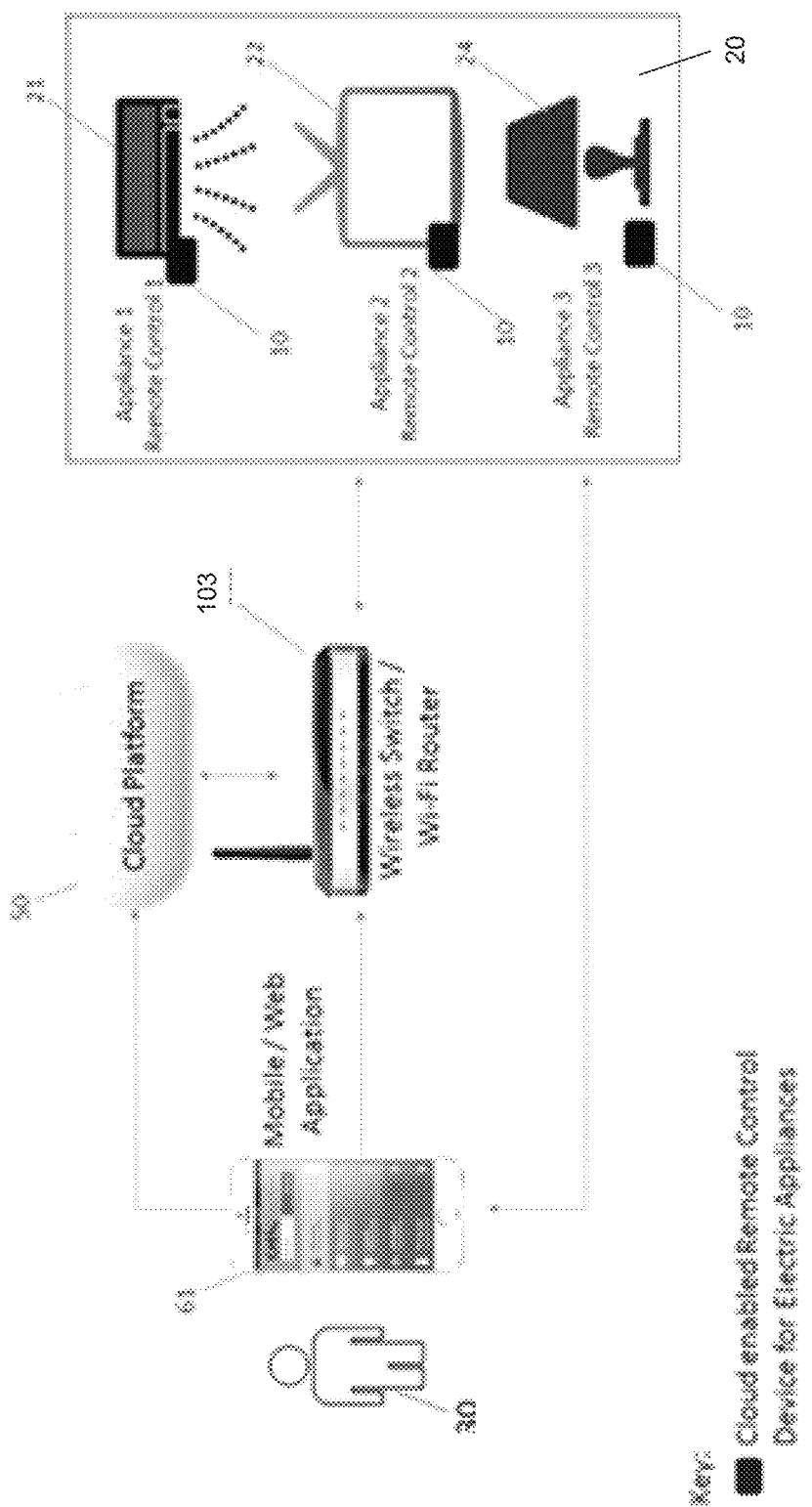
FIG. 2 is a high-level schematic diagram illustrating logical relationships among systems in some arrangements within which the technology can operate.

FIG. 2 is a high-level schematic diagram illustrating logical relationships among systems in some arrangements within which the technology can operate. FIG. 2 illustrates overall system components in some embodiments including various types of IR-enabled electric appliances 20 denoted by reference numerals 21, 22, and 24; cloud-enabled remote control devices 10 for the appliances 20; a cloud platform 50, e.g., including a database and application; a locally deployed Wi-Fi router 103; and a mobile or web application 61 (e.g., on a smartphone 60 of a user 30). FIG. 2 illustrates communication links between the system components. The device 10 connects to a cloud application platform 50 through a Wi-Fi router 103 at the device 10 location via a Wi-Fi module 102 (FIG. 1A) of the device 10.

In various embodiments, the cloud platform 50 provides cloud storage (e.g., cache) and database services. The cloud platform 50 acts as a bridge between hardware and/or software of devices 10, mobile devices 60, and web applications 61. For example, the cloud platform 50 provides utilities for mobile applications to communicate with a database server through predefined application programming interfaces ("APIs"). The cloud platform 50 service use APIs to store device 10 data on a cloud database, so that the data is secure and accessible by the user 30 anywhere. The cloud platform 50 provides services for encryption and decryption of commands and data, maintaining privacy of the user 30. The cloud platform 50 maintains information about device 10 status and provides services for scheduling, statistics, and triggers for firmware over-the-air ("FOTA") updates of devices 10.

The IR codes of plurality of appliances 20 are available in the cloud platform 50. The device 10 is initialized through an onboard program of the microcontroller 140 (FIGS. 1A-1C) after it is powered up. In some embodiments, the device 10 checks for previous association with an appliance 20. In case no previously associated appliance is found (or, e.g., if new codes are available), the device 10 connects to the cloud application platform 50 to download the IR codes corresponding to its associated appliance, e.g. appliance 21, 22, or 24, or any other (or all available appliances). In some embodiments these codes are automatically loaded to the device 10 or to the user smartphone application 61 or both. In some embodiments, the device 10 can record and store IR remote codes transmitted by an appliance remote control, to operate the appliance based on the recorded IR codes.

User actions are recorded and stored in the cloud application platform 50. For example, in various embodiments of the technology, an activity log is stored in the central database of cloud application platform 50 and acknowledgments and/or notifications are sent to one or more users 30 through smartphone 60 mobile or web application 61.

In some embodiments, the devices 10 connect a plurality of IR-enabled appliances 20 to the cloud application platform 50 and to one or more user devices 60. The user 30 can control, monitor and manage their IR-enabled electric appliances 20 through their smartphones or other devices 60 and device 10 irrespective of user location. The device 10 controls one or more associated appliances through an onboard IR transceiver 101 (FIGS. 1A-1B). The acknowledgements and notifications are sent to user 30 through smartphone application 61 and an activity log is stored in cloud platform application database 50.

The cloud platform 50 and mobile or web application 61 manage data including data at rest, referring to inactive data that is stored physically in any digital form (e.g. databases, data warehouses etc.), and data in transit, referring to information that flows over a public or untrusted network such as the Internet and data that flows in the confines of a private network such as a corporate or enterprise Local Area Network (LAN). In various embodiments, the cloud platform 50 and mobile or web application 61 include security measures such as storing all data in secure data centers with a trusted service provider, using intrusion detection and intrusion prevention systems, and using distributed computing technology to improve efficiency, reliability, and resilience against denial of service attacks. In addition, the technology includes redundant backup servers and failover IP address functionality so that devices 10 can connect to the cloud platform 50 even when a cloud platform 50 server is down, e.g., for maintenance.

In some embodiments, data in transit between the microcontroller 140 and Wi-Fi module 102 is secured by symmetric encryption such as a block cipher, e.g., AES-128, AES-192, or AES-256, and a one way hashing algorithm such as SHA1. AES block ciphers encrypt and decrypt data in blocks of 128 bits using cryptographic keys of 128-, 192- and 256-bits, respectively. Two-level encryption using AES and SHA1 for data in transit makes it difficult for an attacker to decrypt communication within the device between the microcontroller 140 and the Wi-Fi module 102.

The Wi-Fi module 102 directly communicates with web applications 61 and the cloud platform 50 using local and wide area networks ("LAN"/"WAN"). In various embodiments, the device 10 uses Wi-Fi Protected Access ("WPA"/ "WPA-2") as a trusted security standard for secure wireless access. A third-party attacker on a LAN/WAN cannot simply recreate device packets after sniffing network traffic because each packet contains a unique packet ID that is generated using highly secure algorithms using AES-128 and SHA hashes, which makes it difficult for an attacker to control the hardware device 10 and appliances 20 without proper authorization and consent of the original user.

The technology defines data protocols for multiple scenarios that keep the information of devices 10 synced with the cloud platform 50, and mobile and Web applications 61. A "Boot Protocol" ensures that when a device 10 connects to a cloud platform 50 server (e.g., via TCP sockets) it informs the cloud platform 50 about the device's unique ID Address, which is added to the cloud platform 50 current connections list and is used for further handling the protocols and data for the device 10. The cloud platform 50 server checks whether the unique ID Address is valid or not, and responds with a message accordingly. If the device is not verified, the server closes the connection.

Once the device 10 is connected and listed in the current devices list, it starts sending "heartbeats" according to a "Heartbeat Protocol" after automatically adjusted intervals. The interval is adjusted intelligently and dynamically to balance the load on server side. The heartbeat message fulfills multiple purposes. It helps in detecting whether the device 10 is online or offline. The heartbeat also contains useful information about the device or the environment where the device is being used, such as temperature and humidity. It also contains information regarding schedule timestamps, and information that is used for smart learning algorithms. The cloud platform 50 keeps a record of the information in the heartbeat and after processing and storing information it sends an acknowledgement to the device with a data packet having useful information for the device (including, e.g., a timestamp, so that the device 10 knows the current time and can adjust its clock and/or execute schedules accordingly). The device status is set to offline if a heartbeat is not received within a specified time interval. These intervals are dynamic and depend on various parameters including current network situation, device health history and other relevant data. In some embodiments, for example, a device 10 sends a heartbeat on a frequency between approximately once every 30 seconds and approximately once every three minutes.

In various embodiments of the technology, actions can be performed according to one or more "Action Protocols" either locally or remotely or via remote controls. If the device 10 is connected to the same Wi-Fi router 103 or network as the user's electronic device (e.g., a mobile or web application 61), the actions are performed locally. In case the device and application 61 are not connected to the same Wi-Fi router 103, the actions are performed remotely via the cloud platform 50. A third scenario occurs when the actions are performed via a legacy remote control, which results in the device sending "Backtrack" information to the cloud platform 50 using a "Backtrack protocol."

In a Local action protocol, the app 61 sends the action information to the device 10, the device 10 performs the action on the appliance, and the app sends an acknowledgment to let the App 61 know when the action is performed. The app 61 then informs the cloud platform 50 that a local action was performed. In a Remote action protocol the app 61 sends action information to the cloud platform 50. The cloud platform 50 processes the information and sends it to the device 10. The device 10 then performs the action on the appliance 20 and sends an acknowledgement to the cloud platform 50. The cloud platform 50 sets the status of the action as completely performed and sends a success notification to the app 61. In a Backtrack protocol, the device 10 receives the action information from the appliance 20 and informs the cloud platform 50 that an action was performed via remote control. The cloud platform 50 stores the action information and sends a backtrack notification to the app 61 of the user for which the device 10 is registered.

In some embodiments, after sending a command, in addition to or instead of reporting that an action such as turning on a light or lowering the temperature on an air conditioner was performed, the device determines whether the sent command was successfully executed, based on information from the device's sensor section 120. For example, the device 10 may detect after sending a signal to turn on a light that the ambient light sensor 113 reading has changed, indicating that the room is brighter. As another example, after sending a signal to lower the temperature on an air conditioner, the device 10 temperature sensor 111 can detect a change in room temperature (e.g., after a few minutes have passed). In response to determining that the appropriate environmental changes have occurred, the device 10 can transmit a notification that the received command was not only successfully sent, but also successfully received and executed by the appliance 20.

A user 30 can also communicate with, control, monitor, and manage multiple appliances 20 directly through the user's smartphone 60 (or other interface 61) and associated devices 10. The cloud platform 50 is not required for device 10 operation in such embodiments.

While various embodiments are described in terms of the environments described above, those skilled in the art will appreciate that the technology may be implemented in a variety of other environments including a single, monolithic computer system, as well as various other combinations of computer systems or similar devices connected in various ways including cloud computing resources. In various embodiments, a variety of computing systems or other different client devices may be used, such as mobile phones, personal digital assistants, televisions and associated video sources, cameras, tablet computer systems, laptop computer systems, desktop computer systems, vehicle computing systems, wearable computing devices, etc.

Figure 3:
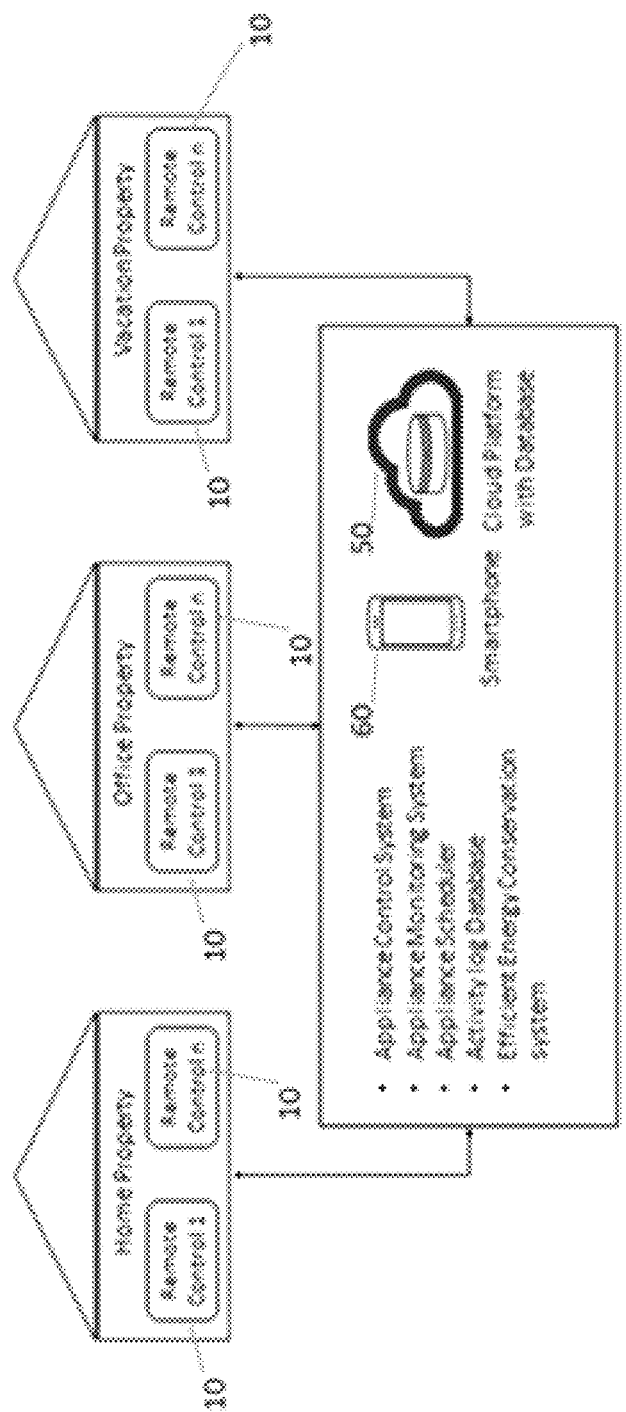
FIG. 3 is a high-level schematic diagram illustrating embodiments in which the technology can control appliances at multiple properties.

FIG. 3 is a high-level schematic diagram illustrating embodiments in which the technology can control appliances at multiple properties. FIG. 3 shows application of the technology at various buildings, e.g., residential, office, vacation, etc. The technology allows the user to deploy systems under various embodiments to control, monitor, and manage their IR-enabled electric appliances at one or plurality of buildings. Devices 10 can be deployed at multiple locations and user(s) can control the associated appliance(s) through a mobile or web interface 61 irrespective of their location(s).

The user can choose to deploy one device 10 with one IR-enabled electric appliance 20. In some embodiments, depending upon the location of appliances 20, more than one appliance 20 may be controlled by one device 10. In some embodiments the user can choose to deploy multiple devices 10 at the same location for multiple appliances 20, e.g., one device 10 per appliance 20 for cloud enabled 50 control, monitoring and management of said appliances 20 irrespective of user location.

Figure 4:
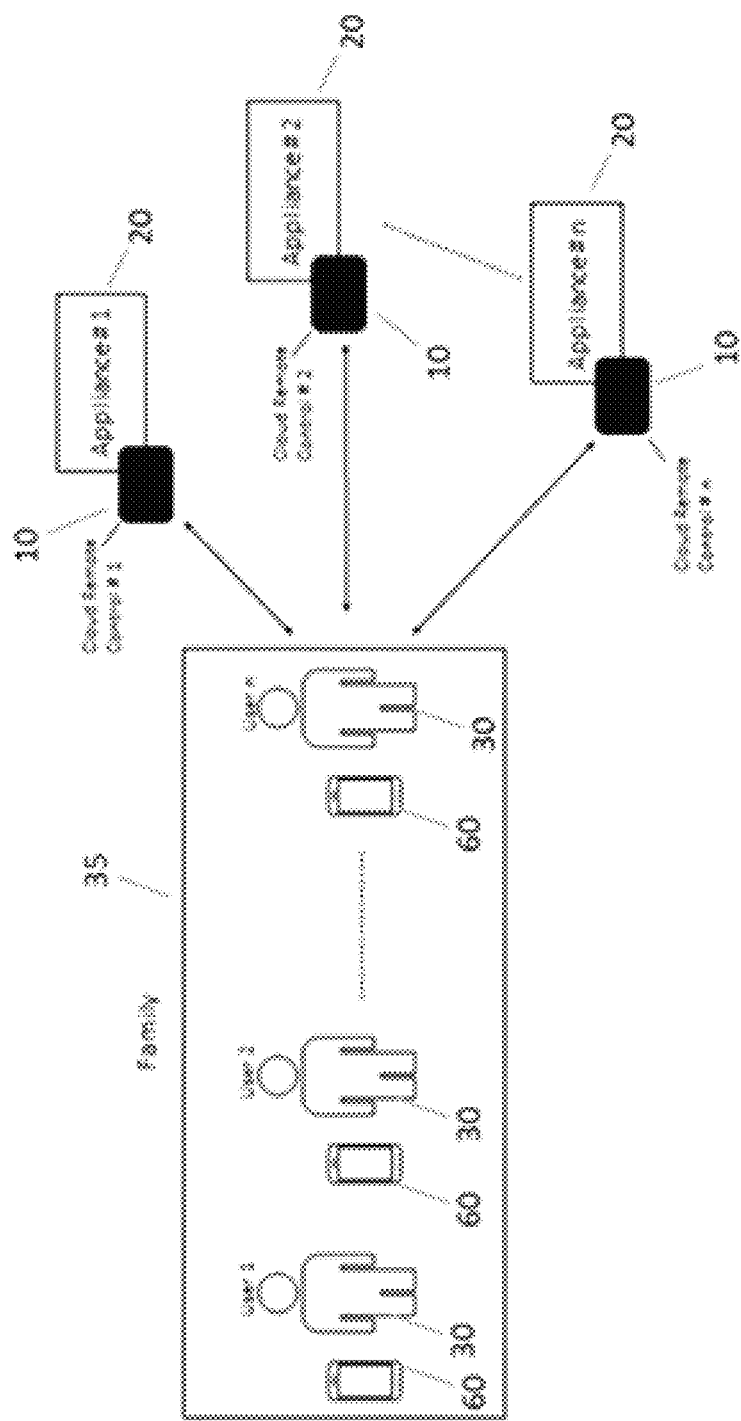
FIG. 4 is a high-level schematic diagram illustrating embodiments in which the technology enables multiple users to control multiple appliances.

FIG. 4 is a high-level schematic diagram illustrating embodiments in which the technology enables multiple users to control multiple appliances. In some embodiments, multiple users 30—e.g., a family or group 35—are capable of communicating, controlling, monitoring and managing multiple appliances 20 directly through smartphones 60 and associated devices 10. In some embodiments, multiple users 30 are assigned to one device 10. In some embodiments there can be multiple users 30 assigned to multiple devices 10.

In some embodiments there can be one user 30 assigned to multiple appliances 20 through associated devices 10 that are geographically apart. In some embodiments there can be multiple users 30 assigned to multiple appliances 20 through associated devices 10 that are geographically apart. The presented technology supports assignment of user(s) 30 through interactive graphical user interface 61 and backend algorithmic and programmatic flows for effective remote monitoring, control and management of appliances 20 through associated devices 10. The technology thus leverages cloud-enabled 50 control, monitoring and management capabilities to said users 30 for assigned appliance 20 through the associated devices 10. Such implementation offers a family architecture of system usage and operation under various embodiments.

FIGS. 5A-5J are high-level schematic diagrams illustrating communication arrangements through which local and/or remote users can control appliances in various embodiments of the technology. It should be noted that there is no intent to limit the disclosure to these applications or forms only; together with the arrangements described below, various possible options, modifications, equivalents, and alternatives fall within the spirit and scope of the present disclosure.

Figure 5A:
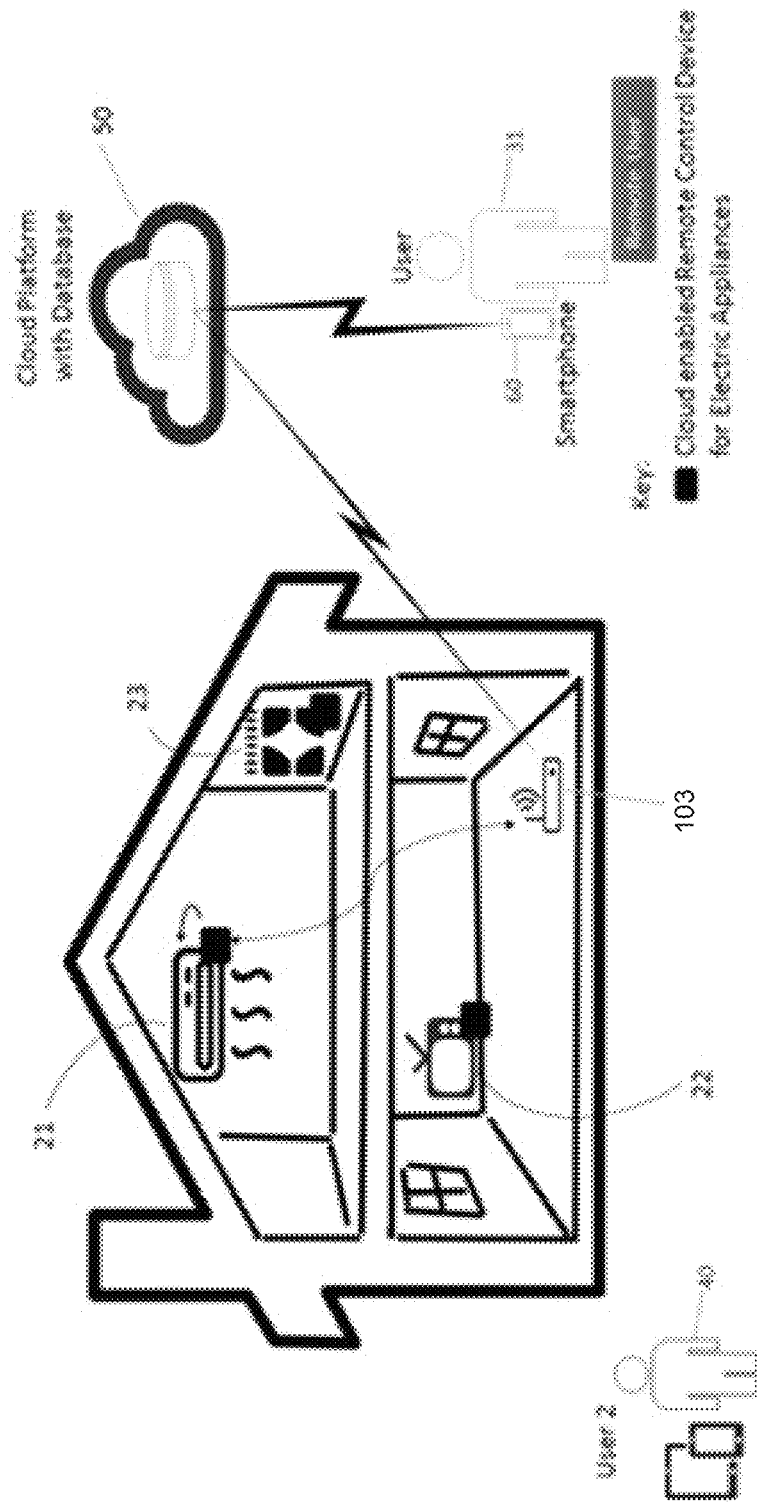

FIG. 5A illustrates possible data communication mechanisms in which remote user(s) 30 control appliances 20 through a local Wi-Fi router 103 (e.g., at the device 10 location) and an associated device 10 with the appliance 20. In some embodiments, commands from remote user(s) 30 can be relayed to the device 10 through a local Wi-Fi router 103. The device 10 uses the onboard IR transceiver 101 to send command data to the associated appliance 20 for appropriate actions. The same Wi-Fi communication medium is used by the device 10 for logging the activity in the cloud platform 50 database and sending the acknowledgment to remote users 30 through their smartphone 60.

In the illustrated embodiment, a remote user 31 is able to control, monitor and manage IR-enabled electric appliances 21, 22, and/or 23 through smartphone application 60 and cloud application platform 50. The user 31 controls appliance 21 through associated device 10. The command string from the user 31 through their smartphone application 60 is communicated to the device 10 through cloud application platform 50 and local Wi-Fi router 103 at device location. The communication between device 10 and Wi-Fi router 103 is based on local Wi-Fi connection at device location. The communication of command string from device 10 to the associated appliance 21 is based on IR transceiver within the device 10. The communication of acknowledgement from the device 10 to the user smartphone application 60 is through local Wi-Fi router 103 at device location and cloud application platform 50. The same communication mechanism is used to log activity feed in the cloud application platform database 50.

Figure 5B:
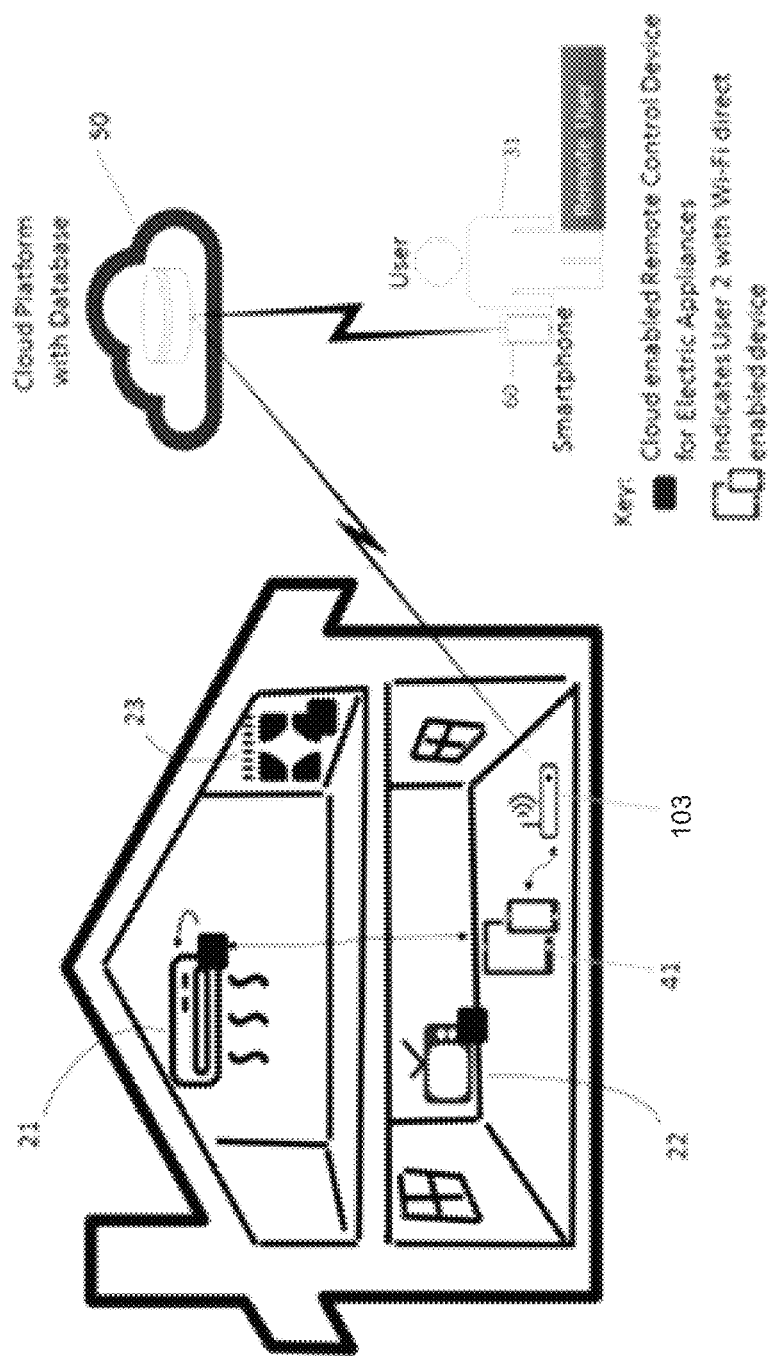

FIG. 5B illustrates possible data communication mechanisms in which remote user(s) control the appliance 20 through local Wi-Fi router 103 and the smartphone or other user device 41 (e.g., of another registered user 40) present at device location and associated device 10 with the appliance 20. In some embodiments, commands from remote user(s) 30 can be relayed to the device 10 through a combination of local Wi-Fi router 103 and the Wi-Fi connection of a local user's smartphone 41 that is registered to use the same device. The device uses onboard IR transceiver subsystem 101 to send command data to associated appliance 20 for appropriate actions. The device 10 can use Wi-Fi communication of a registered local smartphone 40 and Wi-Fi router 103 for logging the activity in cloud platform 50 database and sending the acknowledgment to remote users 31 through their smartphone 60.

In the illustrated embodiment, a remote user 31 is able to control, monitor and manage IR-enabled electric appliances 21, 22, and/or 23 through smartphone application 60 and cloud application platform 50. The user 31 controls appliance 21 through associated device 10. The command string from the user 31 through their smartphone application 60 is communicated to the device 10 through cloud application platform 50, local Wi-Fi router 103 at device location and any other preregistered smartphone application 41 available within the vicinity of device 10. Such embodiments add flexibility to the device as it can connect to any preregistered local Wi-Fi connection to communicate data for enhanced reliability. The communication between device 10 and Wi-Fi router 103 is through Wi-Fi module of device 10 and Wi-Fi connectivity of user application 41 at device location. The communication of command string from device 10 to the associated appliance 21 is based on IR transceiver 101 within the device 10. The communication of acknowledgement from the device 10 to the user smartphone application 60 is through a preregistered local smartphone application 41 and local Wi-Fi router 103 at device location and cloud application platform 50. The same communication mechanism is used to log activity feed in the cloud application platform database 50.

Figure 5C:
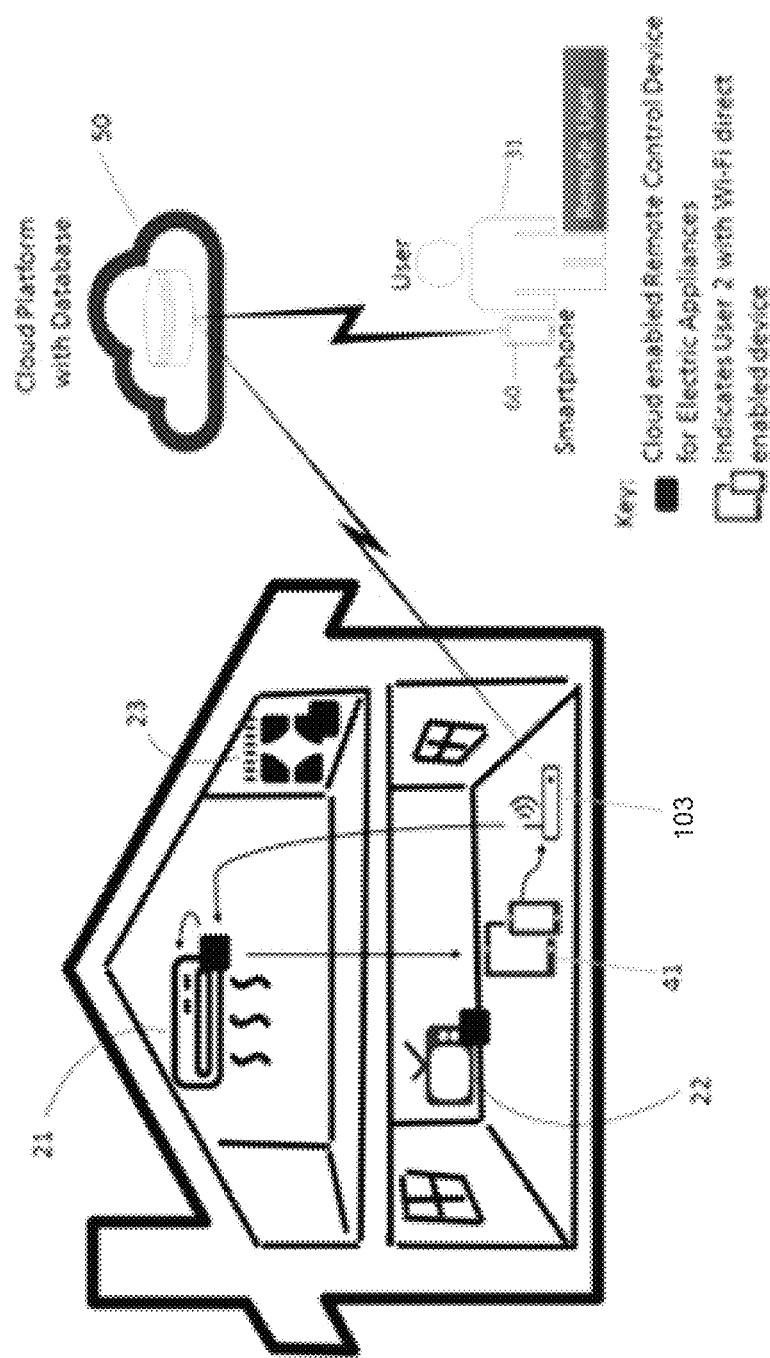

FIG. 5C illustrates possible data communication mechanisms in which remote user(s) control the appliance through local Wi-Fi router 103 and the device. The activity log and acknowledgement are sent back through the smartphone of another registered user present at device location and Wi-Fi router 103. In some embodiments, user(s) commands from remote user(s) can be sent to the device through local Wi-Fi router 103. The device uses onboard IR transceiver subsystem to send command data to associated appliance for appropriate actions. The device can use Wi-Fi communication of a registered local smartphone and public cellular telephone infrastructure through local smartphone for logging the activity in cloud platform database and sending the acknowledgment to remote users through their smartphone.

In the illustrated embodiment, a remote user 31 is able to control, monitor and manage IR-enabled electric appliances 21, 22, and/or 23 through smartphone application 60 and cloud application platform 50. The user 31 controls appliance 21 through associated device 10. The command string from the user 31 through their smartphone application 60 is communicated to the device 10 through cloud application platform 50 and local Wi-Fi router 103 at device location. The communication between device 10 and Wi-Fi router 103 is based on Wi-Fi connectivity. The communication of command string from device 10 to the associated appliance 21 is based on IR transceiver within the device 10. The communication of acknowledgement from the device 10 to the user smartphone application 60 is through a preregistered local smartphone application 41 and local Wi-Fi router 103 at device location and cloud application platform 50. The same communication mechanism is used to log activity feed in the cloud application platform database 50.

Figure 5D:
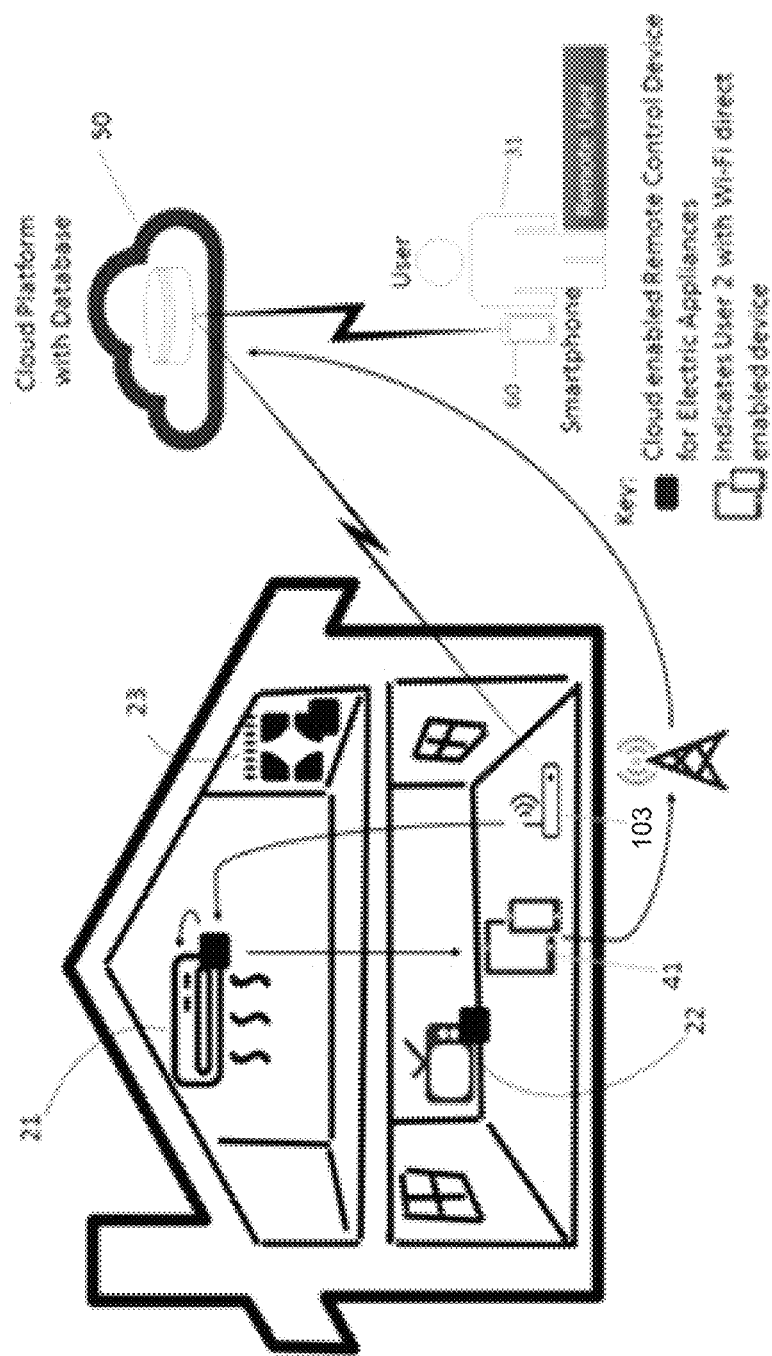

FIG. 5D illustrates possible data communication mechanisms in which remote user(s) control the appliance through local Wi-Fi router 103 and the device. The activity log and acknowledgement are sent back through the smartphone of another registered user present at device location and public cellular telephone infrastructure. In some embodiments, user(s) commands from remote user(s) can be communicated to the device through local Wi-Fi router 103. The device uses onboard IR transceiver subsystem to send command data to associated appliance for appropriate actions. The device can use Wi-Fi communication of a registered local smartphone and public cellular telephone infrastructure through local smartphone for logging the activity in cloud platform database and sending the acknowledgment to remote users through their smartphone.

In the illustrated embodiment, a remote user 31 is able to control, monitor and manage IR-enabled electric appliances 21, 22, and/or 23 through smartphone application 60 and cloud application platform 50. The user 31 controls appliance 21 through associated device 10. The command string from the user 31 through their smartphone application 60 is communicated to the device 10 through cloud application platform 50 and local Wi-Fi router 103 at device location. The communication between device 10 and Wi-Fi router 103 is based on Wi-Fi connectivity. The communication of command string from device 10 to the associated appliance 21 is based on IR transceiver within the device 10. The communication of acknowledgement from the device 10 to the user smartphone application 60 is through a preregistered local smartphone application 41 and cloud application platform 50. The preregistered local smartphone application 41 uses public cellular telephone network infrastructure for communication of data to cloud application platform 50. Such application embodiments enhance versatility and reliability of the system. The same communication mechanism is used to log activity feed in the cloud application platform database 50.

Figure 5E:
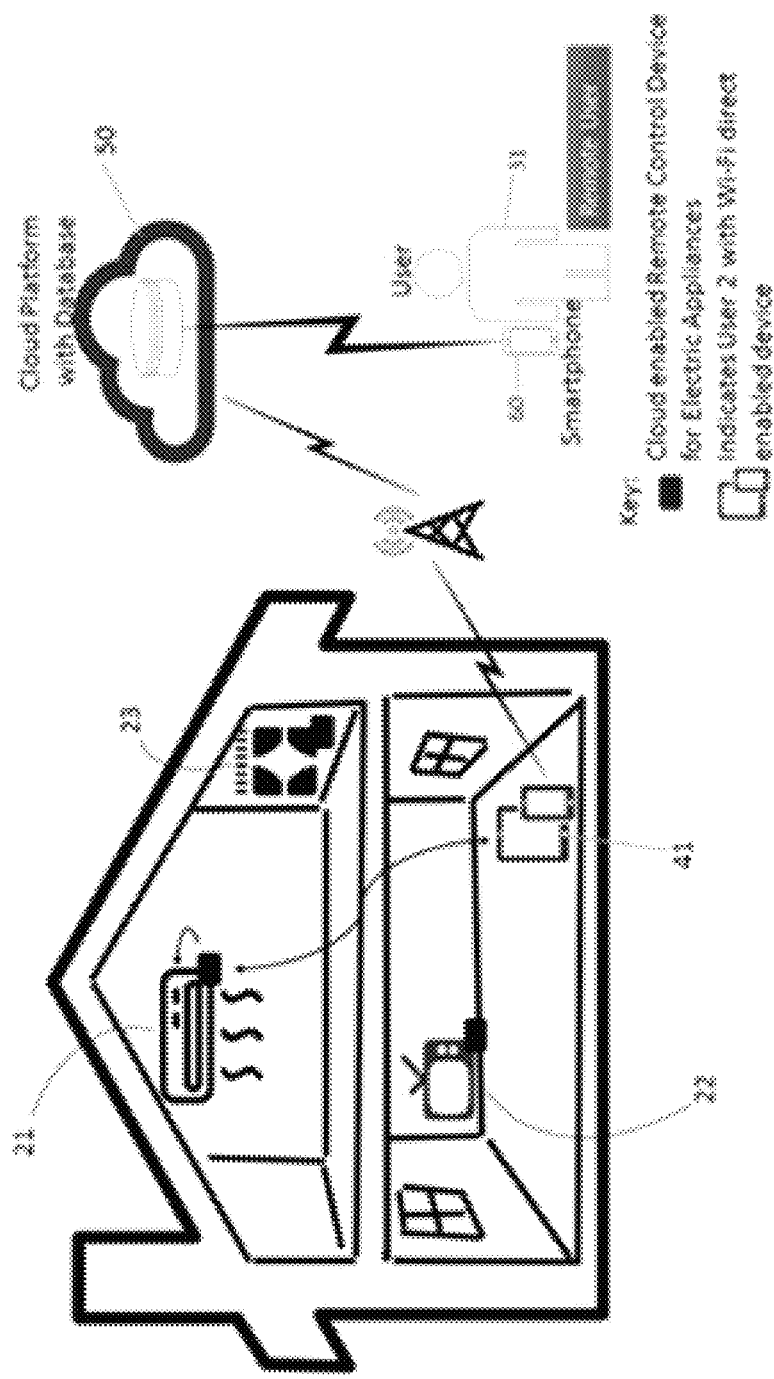

FIG. 5E illustrates possible data communication mechanisms in which remote user(s) control the appliance through public cellular telephone infrastructure and a registered local smartphone user and the device. The activity log and acknowledgement are sent back through the same communication medium. In some embodiments, user(s) commands from remote user(s) can be communicated to the device through public cellular telephone infrastructure and a registered local user's smartphone. The device uses onboard IR transceiver subsystem to send command data to associated appliance for appropriate actions. The device uses same communication medium for logging the activity in cloud platform database and sending the acknowledgment to remote users through their smartphone.

In the illustrated embodiment, a remote user 31 is able to control, monitor and manage IR-enabled electric appliances 21, 22, and/or 23 through smartphone application 60 and cloud application platform 50. The user 31 controls appliance 21 through associated device 10. The command string from the user 31 through their smartphone application 60 is communicated to the device 10 through cloud application platform 50 and any preregistered smartphone application 41 available in the vicinity of device 10. Smartphone application 41 uses public cellular telephone network infrastructure for data communication with cloud application platform 50. The communication between device 10 and preregistered smartphone application 41 is based on Wi-Fi connectivity. The communication of command string from device 10 to the associated appliance 21 is based on IR transceiver within the device 10. The communication of acknowledgement from the device 10 to the user smartphone application 60 is through the preregistered local smartphone application 41 and cloud application platform 50. The preregistered local smartphone application 41 uses public cellular telephone network infrastructure for communication of data to cloud application platform 50. The same communication mechanism is used to log activity feed in the cloud application platform database 50.

Figure 5F:
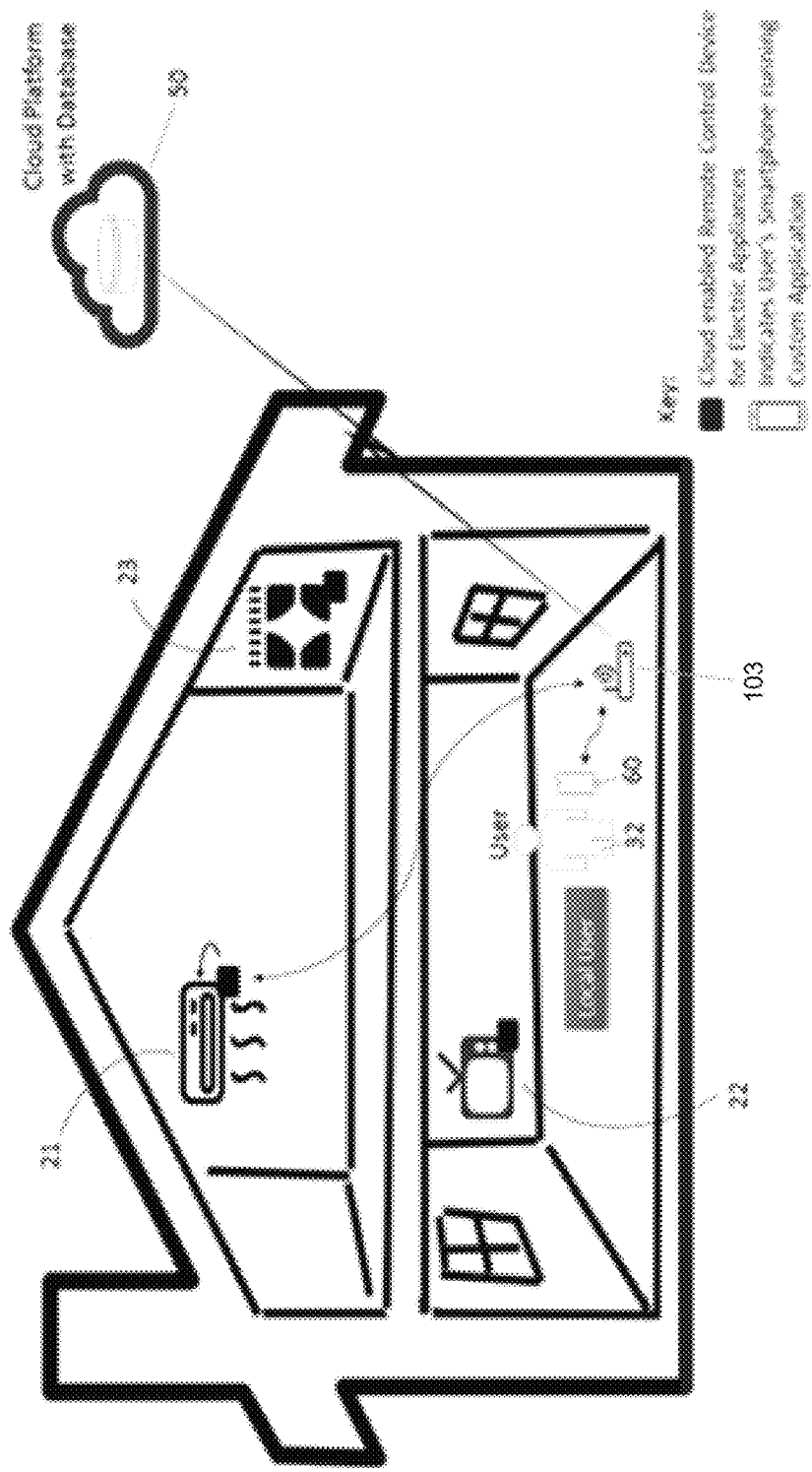

FIG. 5F illustrates possible data communication mechanisms in which local user(s) control the appliance through their smartphone and local Wi-Fi router 103. The activity log to cloud platform and the acknowledgement to the local user are sent through the local Wi-Fi communication link at device location. In some embodiments, user(s) commands from remote user(s) can be communicated to the device through a combination of local Wi-Fi router 103 and a registered local smartphone. The connection between Local Wi-Fi router and local registered smartphone is Wi-Fi based whereas the communication between local smartphone and device is based on Wi-Fi as well. The device uses onboard IR transceiver subsystem to send command data to associated appliance for appropriate actions. The device uses same communication medium for logging the activity in cloud platform database and sending the acknowledgment to remote users through their smartphone.

In the illustrated embodiment, a local user 32 is able to control, monitor and manage IR-enabled electric appliances 21, 22, and/or 23 through smartphone application 60 and cloud application platform 50. The user 32 controls appliance 21 through associated device 10. The command string from the user 32 through their smartphone application 60 is communicated to the device 10 through local Wi-Fi router 103. The communication between smartphone application 60 and the local W-Fi router 103 as well as between local Wi-Fi router 103 and device 10 is based on Wi-Fi. The communication of command string from device 10 to the associated appliance 21 is based on IR transceiver within the device 10. The communication of acknowledgement from the device 10 to the user smartphone application 60 is through the local Wi-Fi router 103. The same communication mechanism is used to log activity feed in the cloud application platform database 50.

Figure 5G:
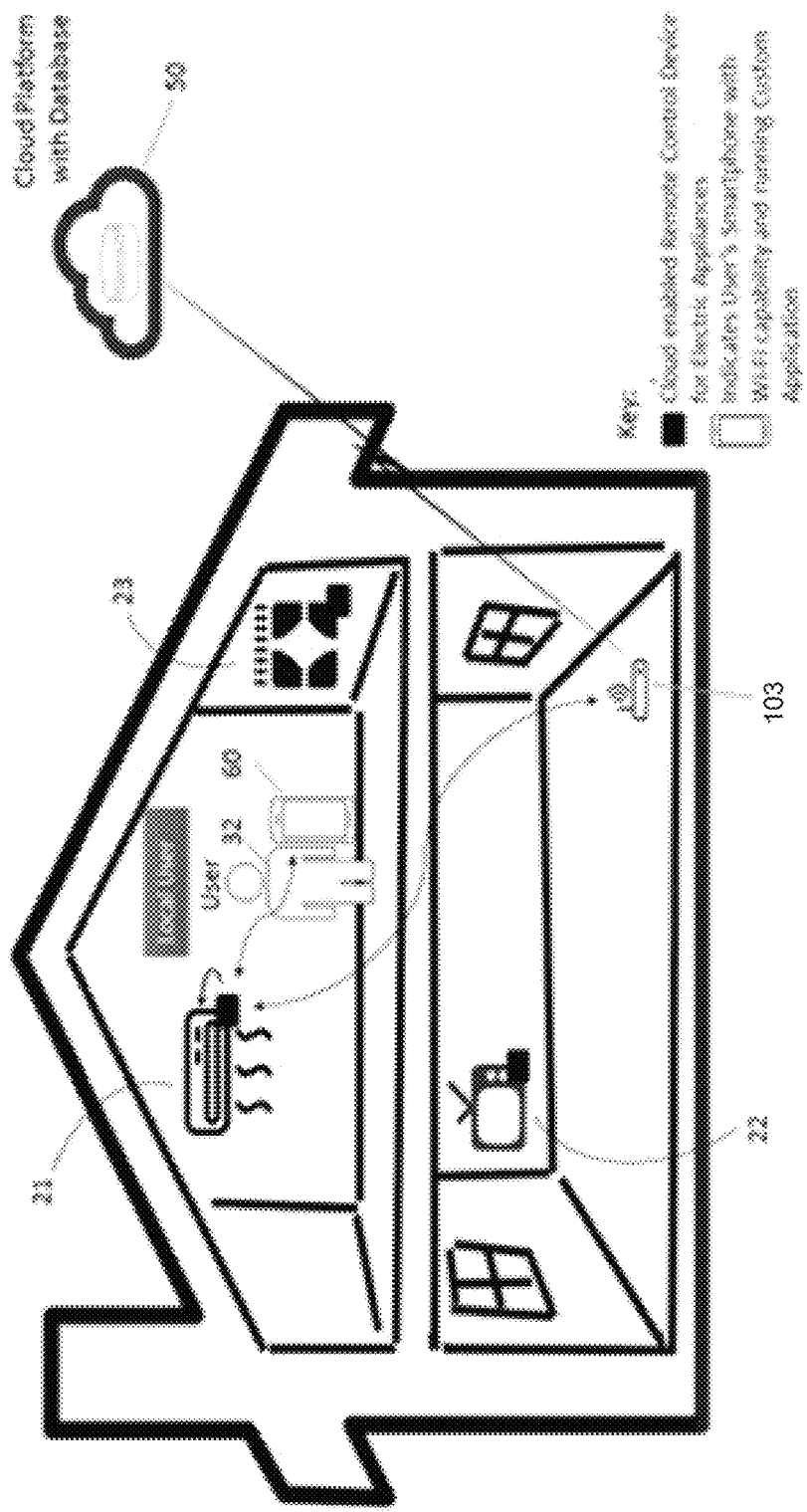

FIG. 5G illustrates possible data communication mechanisms in which local user(s) control the appliance through their smartphone's Wi-Fi link directly with the device. The activity log to cloud platform is sent through the local Wi-Fi router at the device location by the device and the acknowledgement to the local user are sent through the Wi-Fi communication link between device and local user's smartphone. In some embodiments, user(s) commands from local user(s) are communicated to the device through smartphone of the local user and local Wi-Fi router 103. The device uses onboard IR transceiver subsystem to send command data to associated appliance for appropriate actions. The device sends the acknowledgement signal back to the user smartphone through local Wi-Fi router. In addition, the data is sent to cloud platform database for activity log through local Wi-Fi router 103.

In the illustrated embodiment, a local user 32 is able to control, monitor and manage IR-enabled electric appliances 21, 22, and/or 23 through smartphone application 60 and cloud application platform 50. The user 32 controls appliance 21 through associated device 10. The command string from the user 32 through their smartphone application 60 is communicated to the device 10 through Wi-Fi connection between both. The communication of command string from device 10 to the associated appliance 21 is based on IR transceiver within the device 10. The communication of acknowledgement from the device 10 to the user smartphone application 60 is through Wi-Fi connectivity between both. Device 10 uses local Wi-Fi router 103 to log activity feed in the cloud application platform database 50 through Wi-Fi connectivity.

Figure 5H:
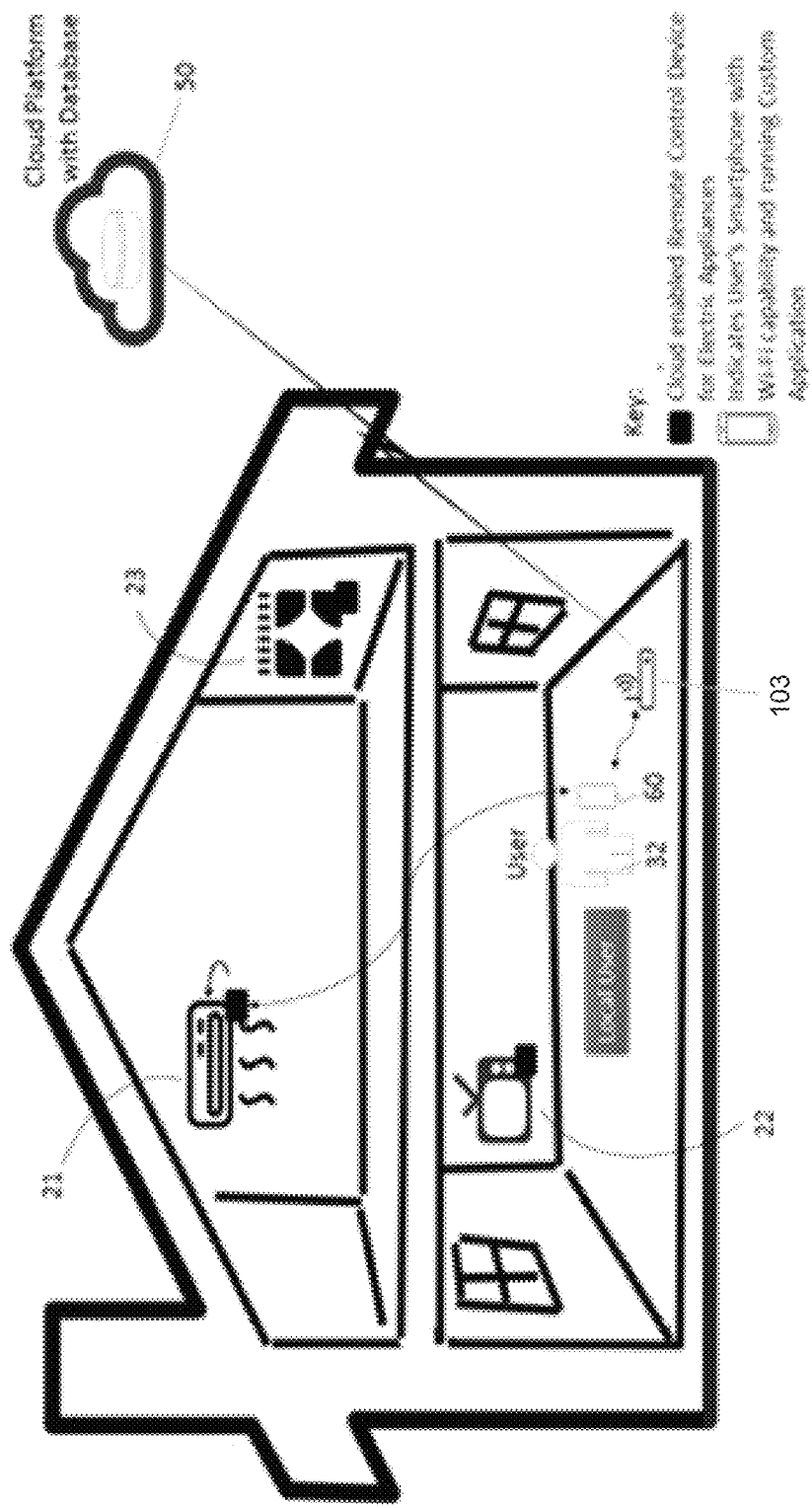

FIG. 5H illustrates possible data communication mechanisms in which local user(s) control the appliance through their smartphones' Wi-Fi connectivity module at device location. The activity log to cloud platform and the acknowledgement to the local user are sent through the local Wi-Fi communication link at device location. In some embodiments, user(s) commands from local user(s) are communicated to the device through Wi-Fi of the smartphone of local user at device location. The device uses onboard IR transceiver subsystem to send command data to associated appliance for appropriate actions. The device sends the acknowledgement signal back to the user smartphone. In addition, the data is sent to cloud platform database for activity log through local Wi-Fi router 103.

In the illustrated embodiment, a local user 32 is able to control, monitor and manage IR-enabled electric appliances 21, 22, and/or 23 through smartphone application 60 and cloud application platform 50. The user 32 controls appliance 21 through associated device 10. The command string from the user 32 through their smartphone application 60 is communicated to the device 10 through Wi-Fi connectivity between both. The communication of command string from device 10 to the associated appliance 21 is based on IR transceiver within the device 10. The communication of acknowledgement from the device 10 to the user smartphone application 60 is through Wi-Fi connectivity between both. The same communication channel is further extended to incorporate local Wi-Fi router 103 with the smartphone application 60 to log activity feed in the cloud application platform database 50 through Wi-Fi connectivity.

Figure 5J:
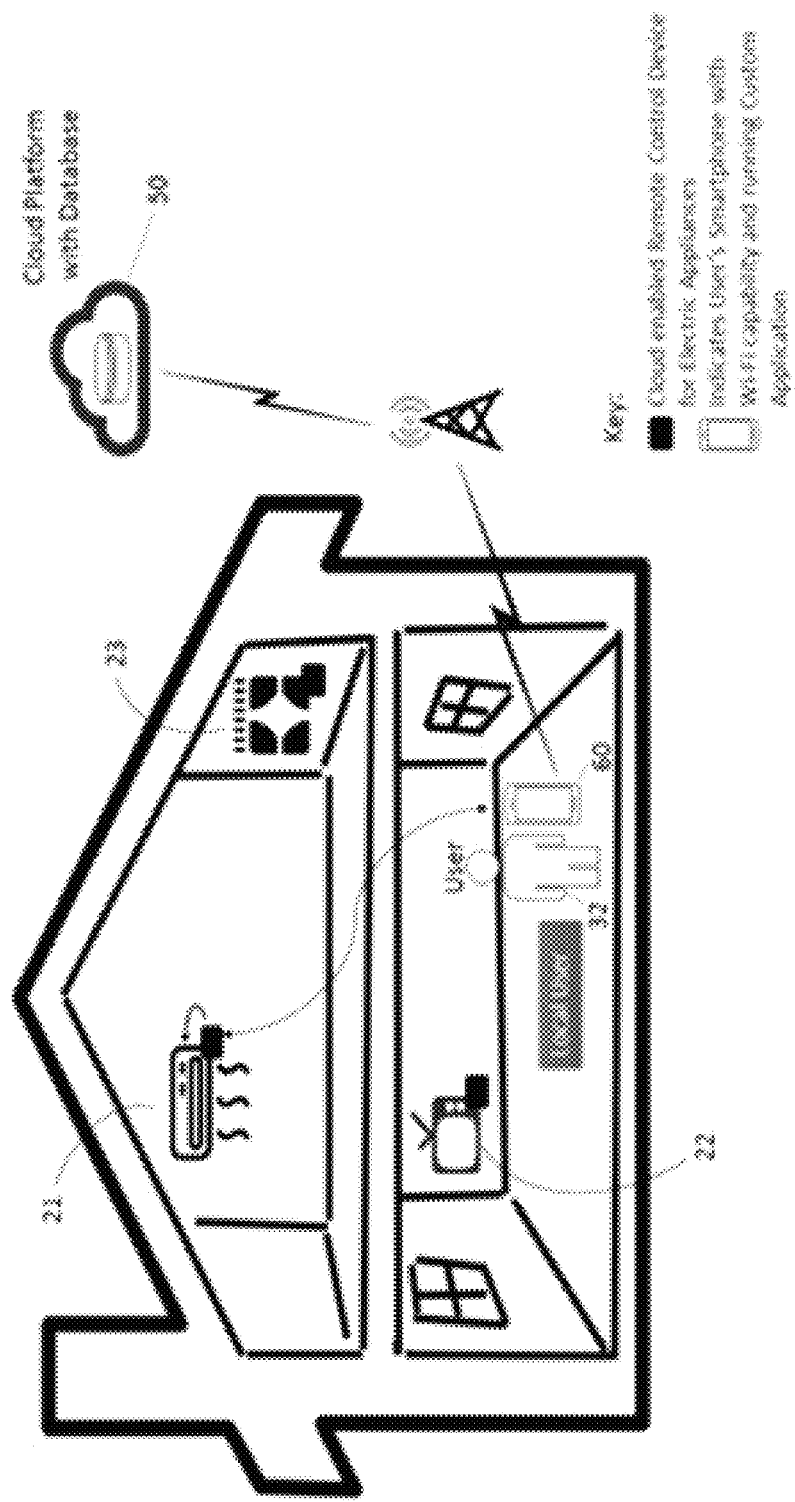

FIG. 5J illustrates possible data communication mechanisms in which local user(s) control the appliance through Wi-Fi communication between the local smartphone and device. The communication between the local smartphone and the device is based on Wi-Fi module and between local user and the cloud application platform is based on public cellular telephone infrastructure. In some embodiments, user(s) commands from local user(s) are communicated to the device through Wi-Fi module of the smartphone of local user at device location. The device uses onboard IR transceiver subsystem to send command data to associated appliance for appropriate actions. The device sends the acknowledgement signal back to the user smartphone through Wi-Fi communication. The smartphone of local user established the communication link with cloud platform database for activity log through public cellular telephone infrastructure.

In the illustrated embodiment, a local user 32 is able to control, monitor and manage IR-enabled electric appliances 21, 22, and/or 23 through smartphone application 60 and cloud application platform 50. The user 32 controls appliance 21 through associated device 10. The command string from the user 32 through their smartphone application 60 is communicated to the device 10 through Wi-Fi connectivity between both. The communication of command string from device 10 to the associated appliance 21 is based on IR transceiver within the device 10. The communication of acknowledgement from the device 10 to the user smartphone application 60 is through Wi-Fi connectivity between both. The same communication channel is further extended to incorporate public cellular telephone network infrastructure by the smartphone application 60 to log activity feed in the cloud application platform database 50.

Figure 6:
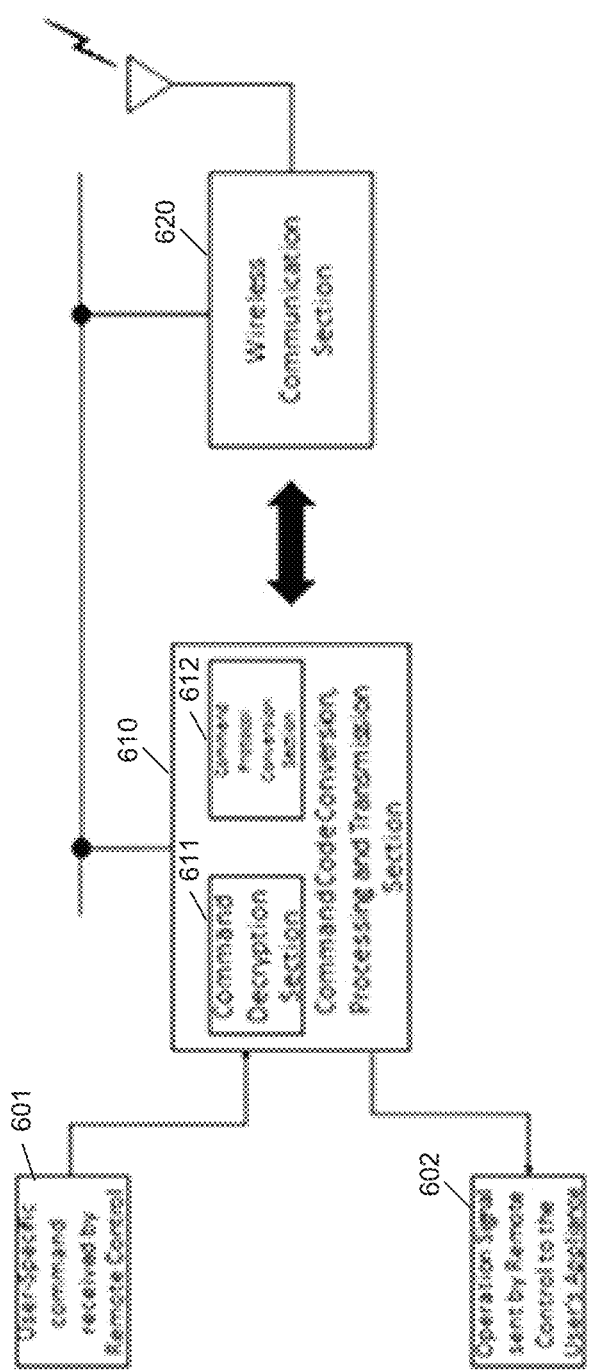
FIG. 6 is a block diagram illustrating subsystems for incorporating legacy IR remote control systems in accordance with some embodiments of the technology.

FIG. 6 is a block diagram illustrating subsystems for incorporating legacy IR remote control systems in accordance with some embodiments of the technology. The illustrated subsystems include a command operation section 610 including onboard command decryption 611 and command protocol conversion 612, and an interface for wireless communication 620. The illustrated subsystems enable conversion, processing, and transmission of user-specific commands 601 to the user's appliance 20. The command operation section 610 of the remote control device performs related processing on the user-specific commands. The processing includes command decryption 611 and command protocol conversion 612 to hardware friendly-binary codes. The processing section 610 is also responsible for transmitting the hardware friendly binary codes to user's appliance through IR transceiver. Wireless communication section 620 is there to build a communication bridge between mobile phone application 61, cloud platform 50, and the remote control device.

The IR transceiver subsystem within the device enables users to use legacy remote controls if desired in parallel to the device. The device captures data of legacy remote controls 602 and logs it on the cloud database 50 for effective synchronization of the subsystems and providing accurate analytics to the users 30. In addition, the user is kept updated by synchronizing data on smartphone application, web application and cloud database.

Figure 7:
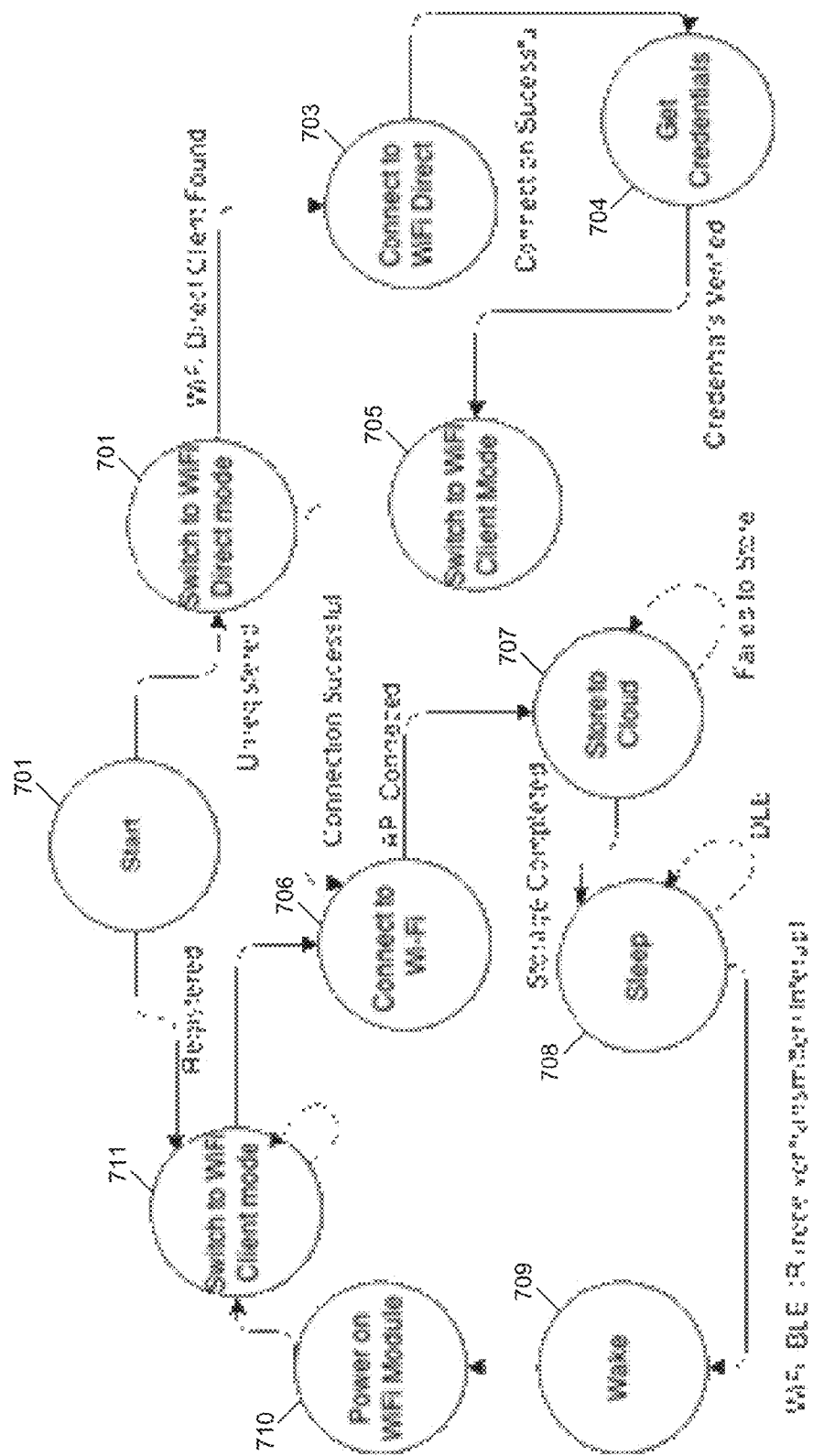
FIG. 7 is a state diagram illustrating flows for a device to connect to a Wi-Fi network in accordance with some embodiments of the technology.

FIG. 7 is a state diagram illustrating flows for a device to connect to a Wi-Fi network in accordance with some embodiments of the technology. The state diagram illustrates communication routes and decisions made by the remote control device 10 modules to pass instructions. Start state 701 is the power on self-test ("POST"). If the device is registered, associated with a user, family, Wi-Fi network service set identifier ("SSID") or a service, it calculates a power metric, probing all components of the device 10 and identifying system health and battery status. The device 10 switches to Wi-Fi client mode 711 and connects to the registered Wi-Fi network 706. If the device is unregistered, the state will switch to Wi-Fi Direct mode 702 and search for Wi-Fi Direct clients. After successfully connecting to a Wi-Fi Direct client 703, and getting and verifying Wi-Fi communication credentials 704, the remote control device state will switch to Wi-Fi client mode 705 and connect to a Wi-Fi network 706, e.g., a home wireless router. This process results in successful device registration, and power metric calculation starts. Based on the results of power metric calculation, the device will make communication or storage decisions. The device will go to sleep state 708 after completing the storage of data to the cloud 707. On the other hand, after the power metric calculation, if the result shows device in high power mode, Wi-Fi module will be powered on 710. The data will be stored to cloud 707 after connecting to Wi-Fi device, failing to store will result in reattempts. The device will go to sleep state 708 after completing the storage and wake again when receives an interrupt 709 through Wi-Fi or IR (transceiver) communication. In some embodiments, the device saves power using onboard algorithms to switch amongst various modes of operation, for example, Wi-Fi client mode or Wi-Fi direct mode.

Figure 8:
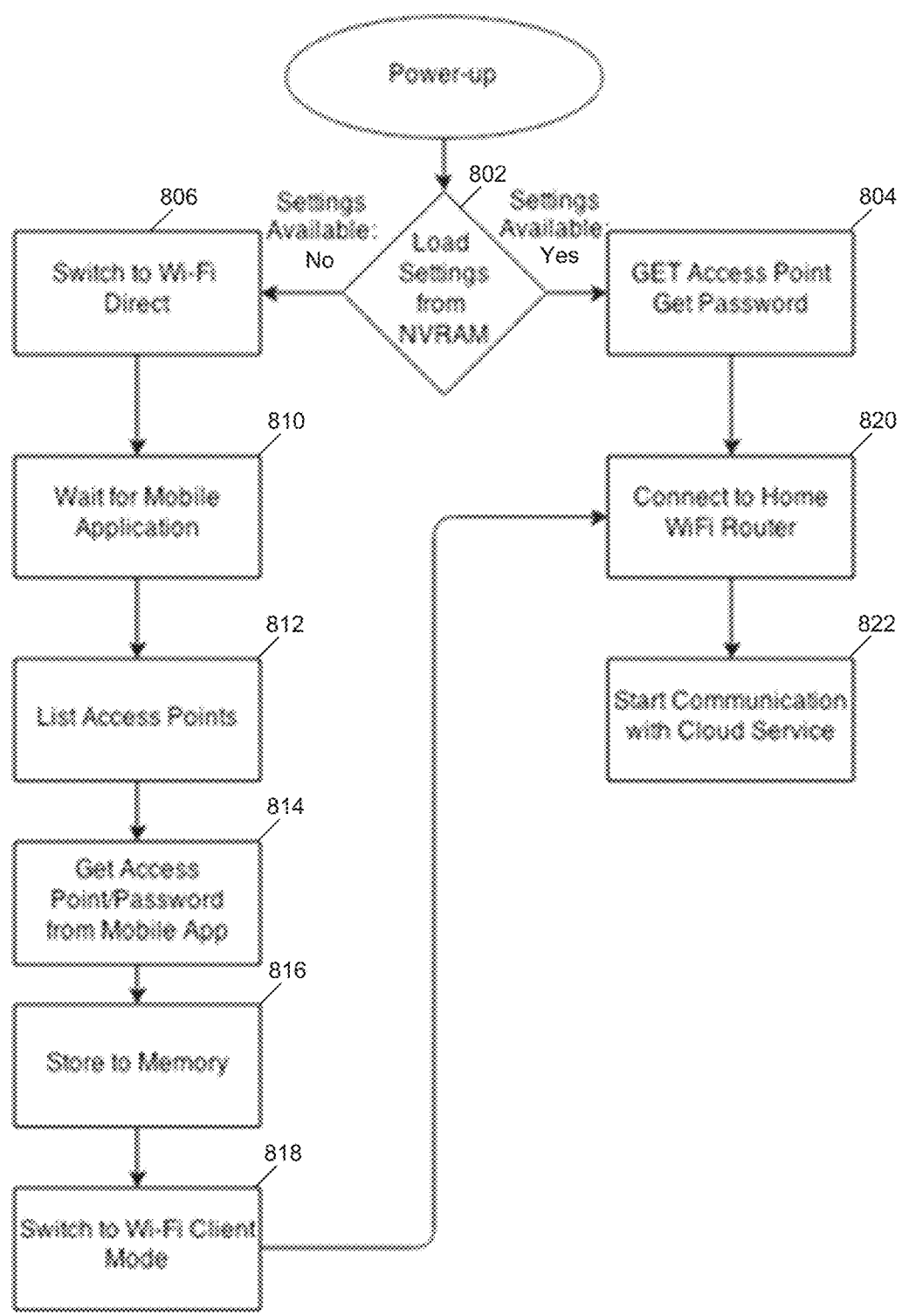
FIG. 8 is a flow diagram showing steps typically performed by a device at power up in accordance with some embodiments of the technology.

FIG. 8 is a flow diagram showing steps typically performed by a device at power up to start communication with a cloud service in accordance with some embodiments of the technology. Upon power up, at block 802, the system searches internal nonvolatile random access memory ("NVRAM") for system setting. By default, these are empty. Examples of such settings include Wi-Fi home router username, password, power settings etc. When such settings are present, at block 804, the device 10 gets the local Wi-Fi network ID and password from the settings, and at block 820 it connects to the Wi-Fi network. Returning to block 802, when it fails to locate these settings, at block 806, the remote control device 10 switches Wi-Fi module to Wi-Fi direct mode. At block 810, the device 10 waits for a user (e.g., a mobile application) to connect via Wi-Fi direct. At block 812, the mobile application queries the remote control device 10 for a listing of its available wireless access points. At block 814, the mobile application gets the name and password from the user and at block 816, saves to system settings memory. At block 818, the remote control device then switches Wi-Fi module back to client mode and at block 820 connects to the home Wi-Fi router from where at block 822 the communication to cloud platform establishes.

Those skilled in the art will appreciate that the steps shown in FIG. 8 and in each of the flow diagrams discussed below may be altered in a variety of ways. For example, the order of the steps may be rearranged; some steps may be performed in parallel; shown steps may be omitted, or other steps may be included; etc.

Figure 9:
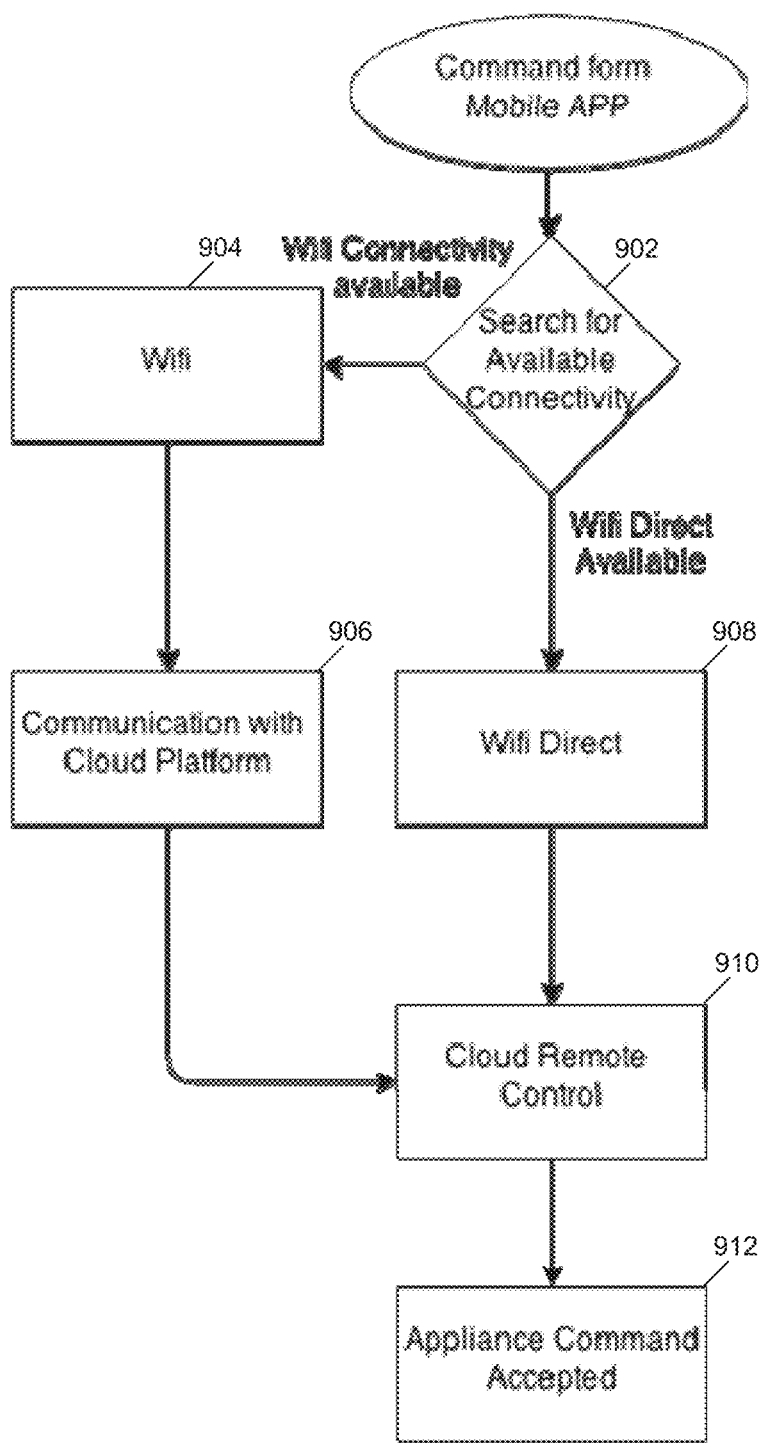
FIG. 9 is a flow diagram showing steps typically performed by the technology to accept a command via Wi-Fi in accordance with some embodiments.

FIG. 9 is a flow diagram showing steps typically performed by the technology to accept a command via Wi-Fi in accordance with some embodiments, illustrating the onboard choice and selection of communication subsystems available on the device. FIG. 9 illustrates processes involved in performing an action by the user who is sending command through mobile application and acceptance of that command by the IR based device 10. When the remote control device receives a command from mobile application directly or cloud application via telemetry, at block 902 the system searches for available connectivity, e.g., Wi-Fi Client or Wi-Fi direct. At block 904, the device 10 connects to a Wi-Fi client network (e.g., a network through a local Wi-Fi router 103), and at block 906 the device 10 connects to the cloud service 50 and at block 910 receives the command. Returning to block 902, if the device 10 is in Wi-Fi direct mode, and a connection to a Wi-Fi device (e.g., a user's smartphone or computer), then at block 908 the device 10 makes the Wi-Fi direct connection to the Wi-Fi device and at block 910 receives the command. After storing the command operation data to the cloud platform 50 and transmitting it to the appliance 20, the remote control device 10 goes back to sleep mode 708 (FIG. 7).

Figure 10:
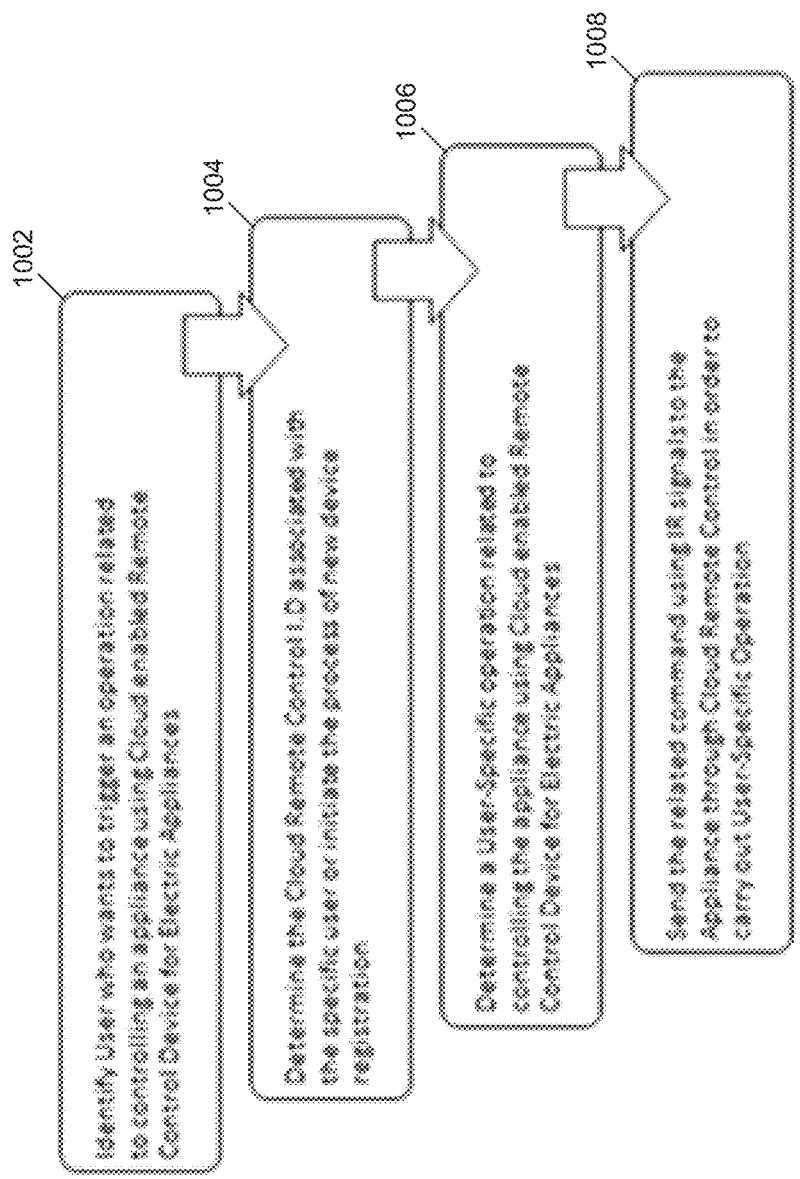
FIG. 10 is a flow diagram showing steps typically performed by the technology to process a user command in accordance with some embodiments.

FIG. 10 is a flow diagram showing steps typically performed by the technology to process a user command in accordance with some embodiments. It illustrates a user identification and validation process before a command is executed to ensure system security. FIG. 10 shows steps of a process of sending user-specific commands to an appliance 20, and logical decisions made by mobile application and cloud service. In block 1002, the routine starts with the identification of user initiating device operation. In block 1004, the system determines a remote control device identification code ("ID") associated with that user. In case of not being able to find any associated device ID results in new device registration. In block 1006, the mobile application and/or cloud service then recognize user-specific command related to trigger a device operation and in block 1008 send it to remote control device which transmits the specific IR signal to user's appliance 20.

Figure 11:
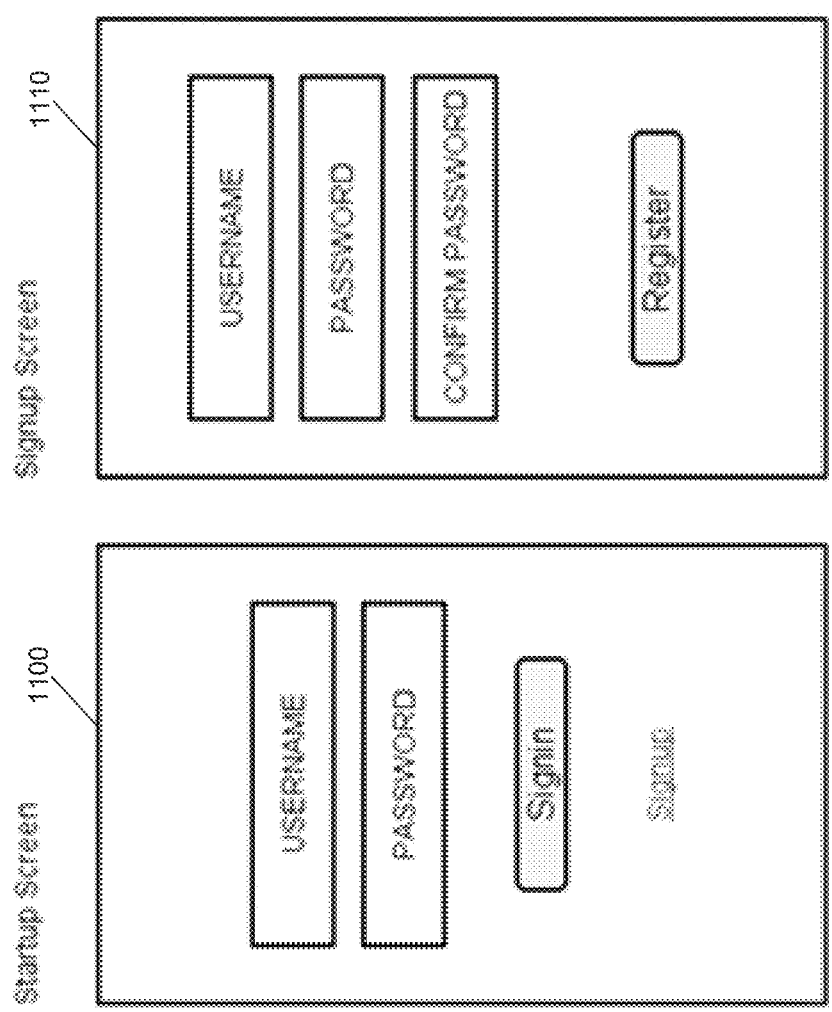
FIG. 11 is a display diagram illustrating startup and user signup screens of a smartphone application in accordance with some embodiments of the technology.

FIG. 11 is a display diagram illustrating startup and user signup screens of a smartphone application in accordance with some embodiments of the technology. It shows a mobile application's startup screen 1100 for signing in an existing user and signup screen 1110 for registration of a new user. The sign in screen 1100 accepts the inputs of existing username and password of a registered user and displays "sign in"/"sign up" buttons. On the other hand, the illustrated sign up screen 1110 requests the inputs of username (or, e.g., email address) and password (and, as depicted, password confirmation) of a new user and displays a "register" button. In some embodiments the steps for signup of the user for smartphone application include choosing the unique username, password and confirming the passwords through the graphical user interface. The provided data by the user is logged in the backend cloud platform database. The steps for signing in are providing the username or selecting already username on the graphical user interface and entering the password.

FIGS. 12A-12F are display diagrams illustrating screens of a smartphone application to connect a device to a Wi-Fi network in accordance with some embodiments of the technology. In the illustrated process, the registration of a device 10 is through scanning a QR code provided on the packaging or on the device itself and associating it with the desired appliance 20 by selecting the name from the available list or naming it as per user's choice. The same process is repeated for registration of multiple devices. The illustrated device setup screens of a smartphone application depict linking the device(s) with available Wi-Fi router(s) at the user location.

In some embodiments, the user has two or more options to register a remote control device for user-controlled operation. First, an automatic Quick Response code ("QR code") scanning option which automatically detects the device ID and stores it in cloud, associated with the specific user. Second, the technology allows a user to manually select the remote control device operation type and enter the device identification. For example, the interface may present options to add appliances such as an air conditioner, refrigerator, thermostat, light, fan, etc.

Figure 12A:
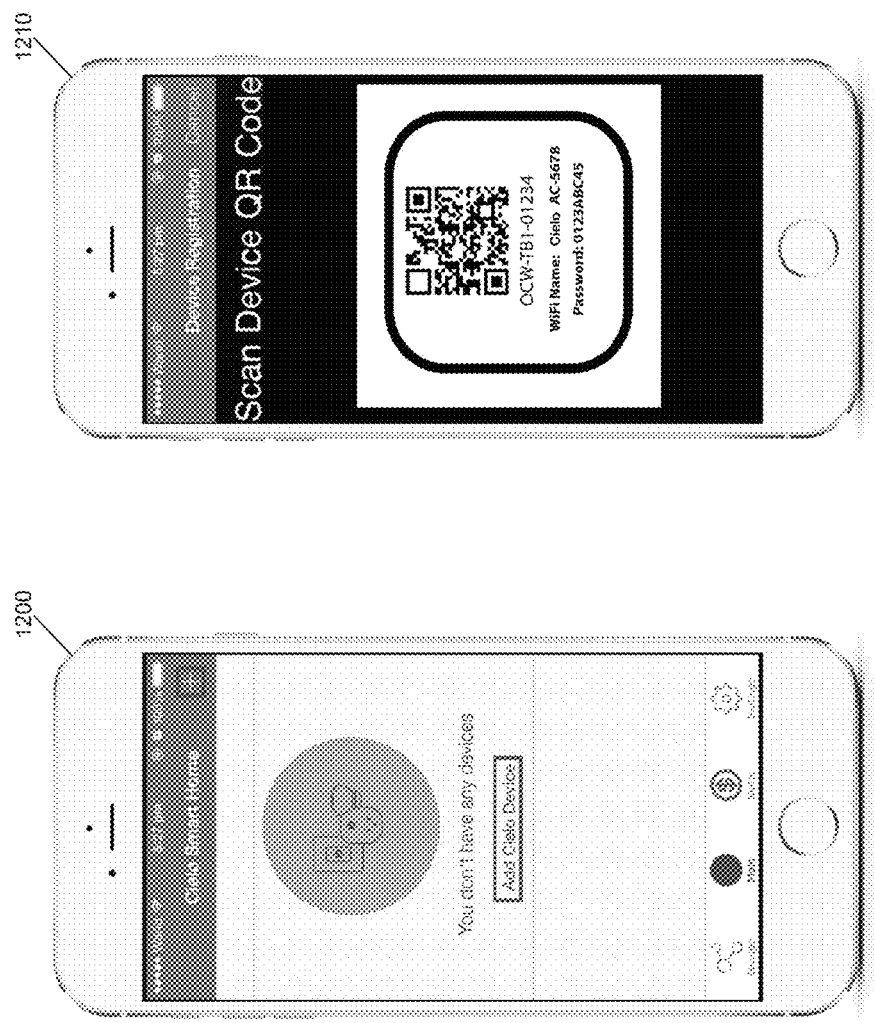
FIGS. 12A-12F are display diagrams illustrating screens of a smartphone application to connect a device to a Wi-Fi network in accordance with some embodiments of the technology.

Turning to FIG. 12A, in screen 1200 the interface enables a user to add a new device 10 controlling an air conditioner appliance using QR code (or other barcode, text, or other readable code pattern) recognition. The interface directs the user to press the "+" button on top right corner or "Add Cielo Device" link on the application screen. In response, a "Scan Device QR Code" screen 1210 appears. In the depicted screen 1210, the user scans a QR code printed on a device 10. The code shown includes a device identifier, a Wi-Fi direct network identifier, and a password.

Figure 12B:
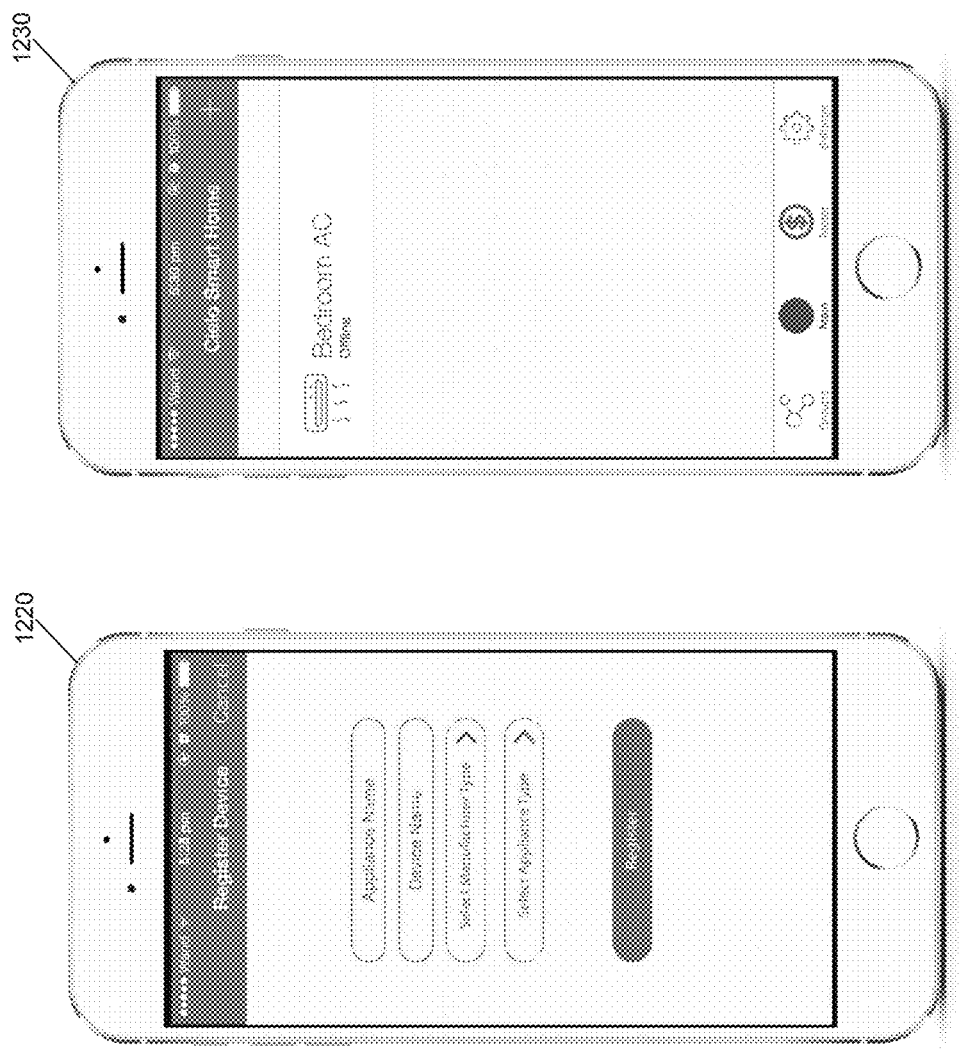

Turning to FIG. 12B, after verification of scanned code, an appliance information screen 1220 allows the user to enter information about the appliance 20 that the device 10 will control. For example, in the depicted screen 1230, the user successfully registered information about a bedroom air conditioner.

Figure 12C:
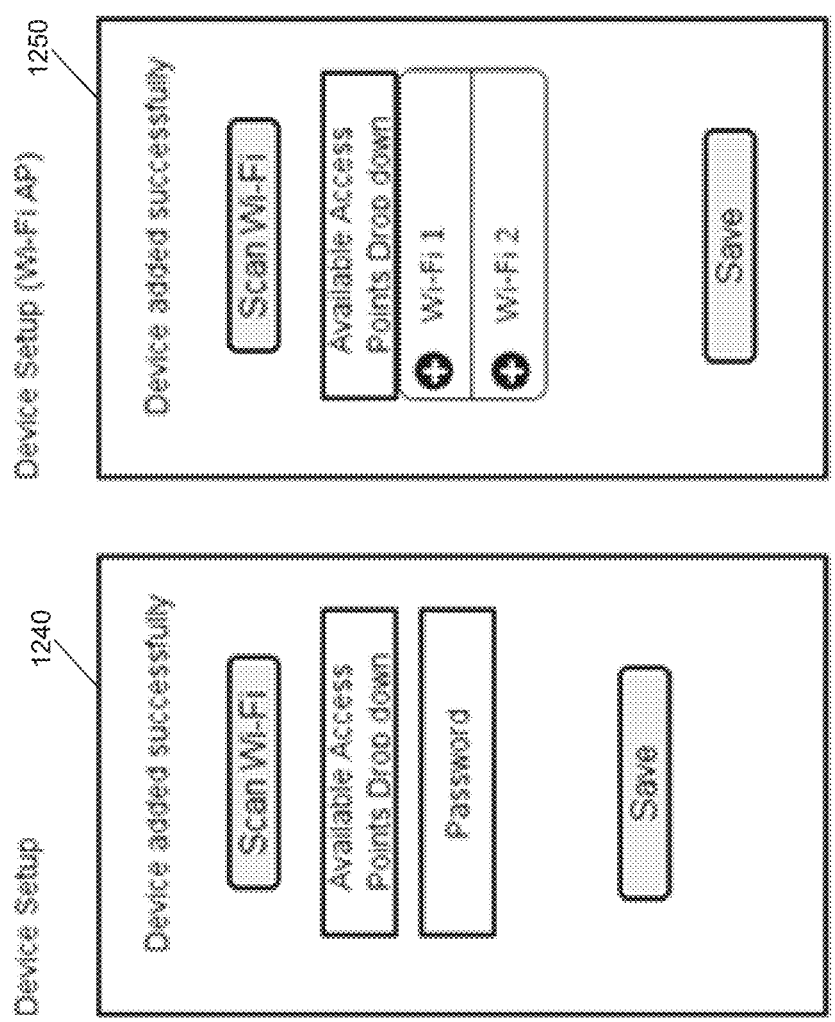

FIG. 12C shows a mobile application's device Wi-Fi communication setup screens. In the mobile application, the user can select available Wi-Fi access points from a dropdown menu and enter the access point password to establish direct communication through it. The Wi-Fi access point information and password will be saved in mobile application and cloud platform to set up the device 10 to access an available Wi-Fi network.

Figure 12D:
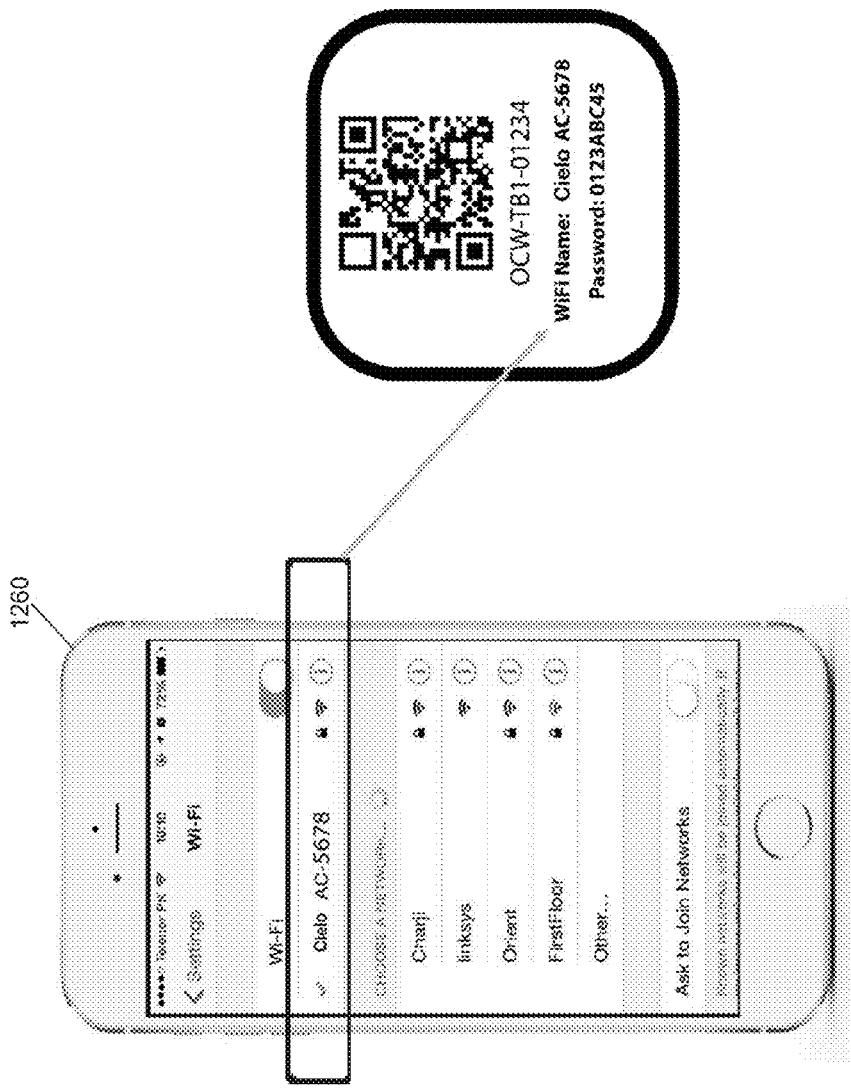

FIG. 12D illustrates connecting a smartphone to a device 10 via Wi-Fi direct. The network setting screen 1260 shows that the user has successfully connected to the Wi-Fi direct network of a device 10, corresponding to the network scanned in screen 1210 (FIG. 12A).

Figure 12E:
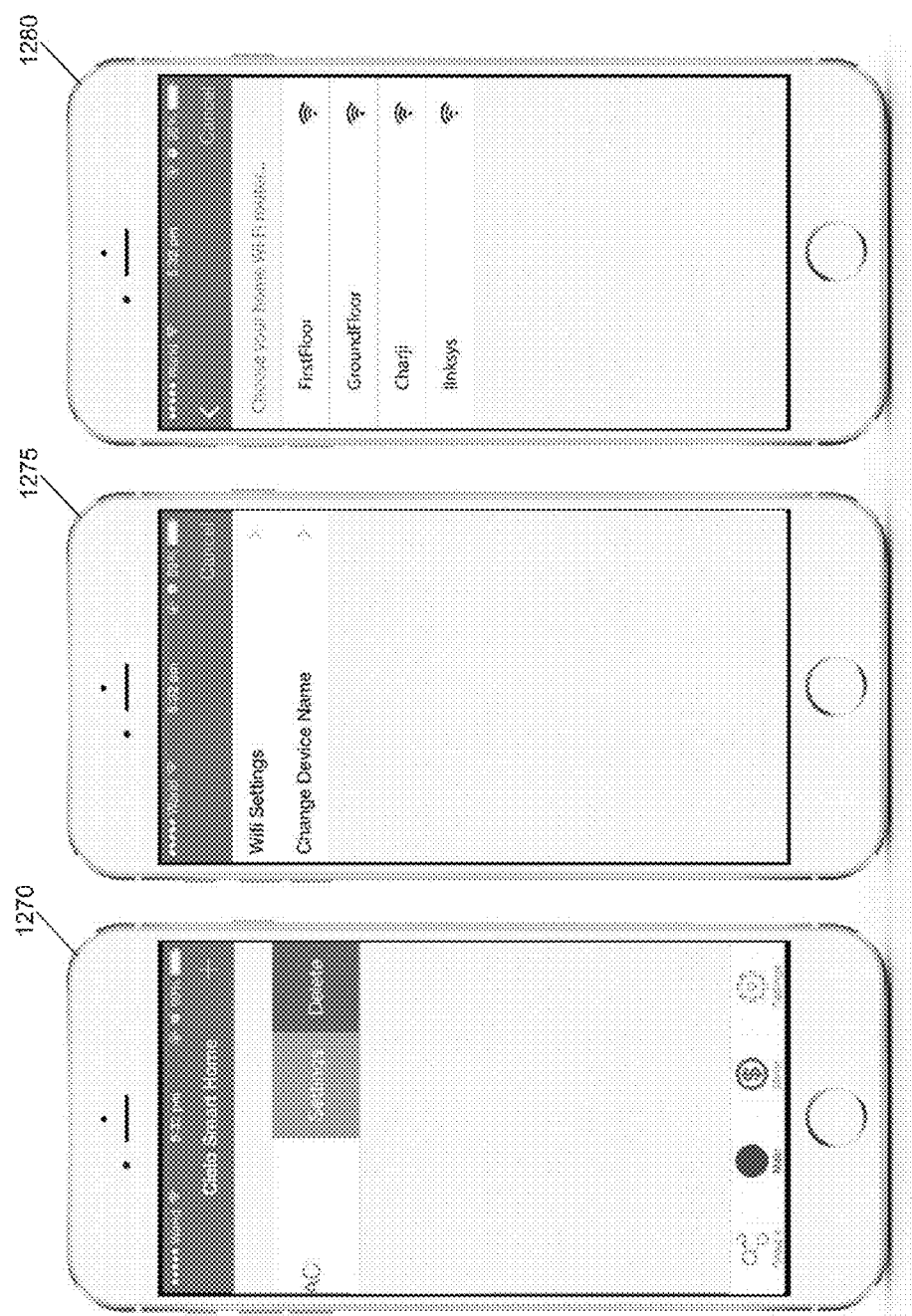

In FIG. 12E, after the user's smartphone or other Wi-Fi-enabled computing device is connected to the device via Wi-Fi direct, the user interfaces 1270, 1275, and 1280 enable the user to modify settings of the device 10 associated with the appliance (here, the bedroom air conditioner) to enable the device to connect through a local Wi-Fi network and the Internet to the cloud service 50.

Figure 12F:
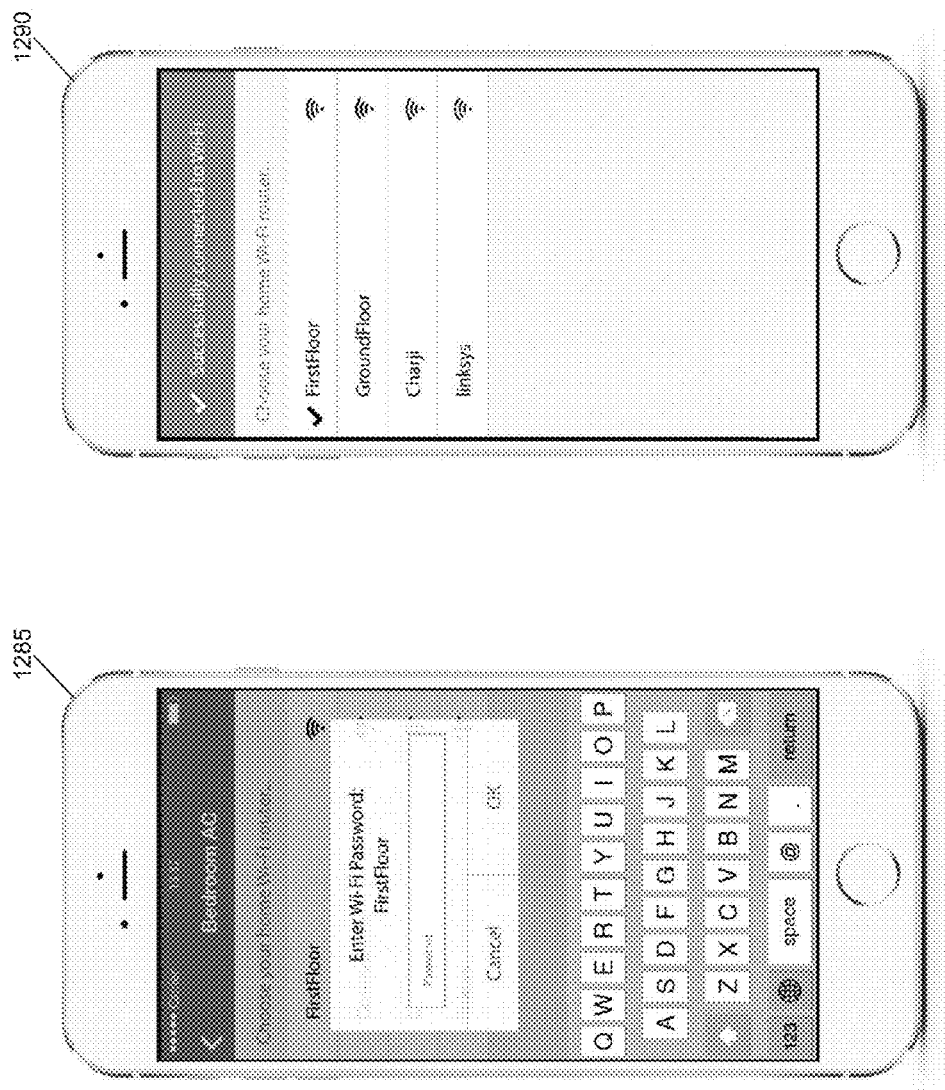

In FIG. 12F, the interface prompts the user to enter a password for the device to connect to a "FirstFloor" Wi-Fi network. In some embodiments, the technology provides saved access credentials (e.g., as provided in FIG. 12C) to the device 10. After an available network and associated password have been entered, the device 10 can successfully connect to the internet, and stops broadcasting its Wi-Fi direct information.

Figure 13:
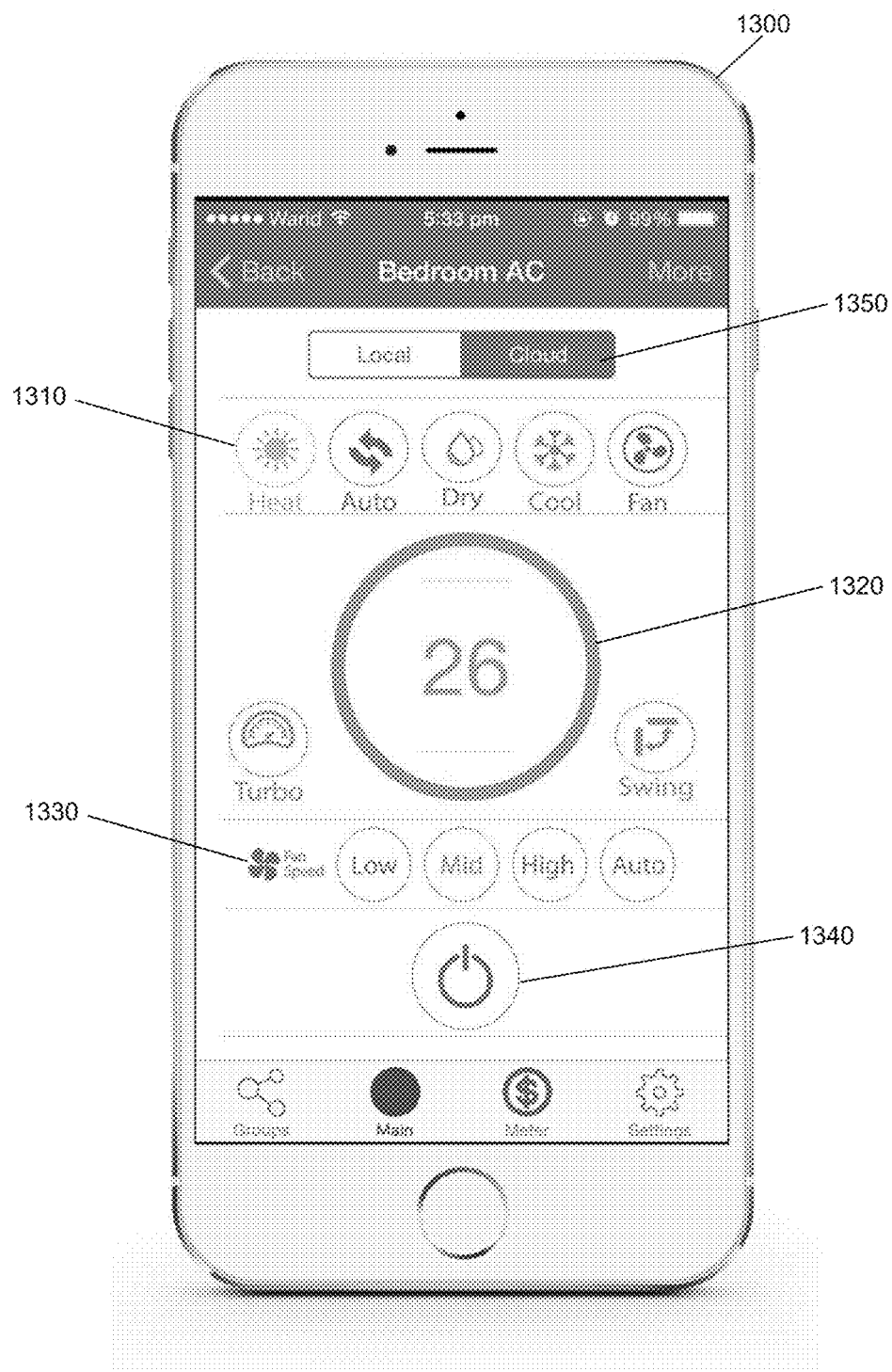
FIG. 13 is a display diagram illustrating an air conditioner control screen in accordance with some embodiments of the technology.

FIG. 13 is a display diagram illustrating an air conditioner control screen 1300 in accordance with some embodiments of the technology. In various embodiments, the screen can be presented on a smartphone, tablet, computer, television, wearable device, or other display. The air conditioner control screen shows controls specific to a remotely controlled air conditioner unit. In some embodiments, the technology displays a set of controls that are configured to correspond to features of the user's particular appliance (e.g., swing louvers on the user's model of air conditioner, or picture-in-picture controls on a television set). The illustrated controls include air conditioner modes 1310 such as heat, cool, dry, automatic, and fan-only modes; a central temperature slider control 1320; fan speed selections 1330; and a power switch 1340.

At the top of the screen 1300 is a local/cloud selector 1350. This selector allows operation of appliances in at least three modes such as those described above in connection with FIGS. 5A-5J. In Wi-Fi Direct Mode, the air conditioner (or other appliance 20 accessed via a device 10) can be controlled directly from a user's mobile phone or other Wi-Fi-enabled computing device without the need of any home Wi-Fi router or the Internet, as described above in connection with FIGS. 5H and 5J. For example, as illustrated in FIG. 12D, the user can connect a smartphone 60 or other wireless device via Wi-Fi Direct to the device 10, enabling the user to control the appliances 20 associated with the device 10. In Wi-Fi Direct Mode, the user selects the "local" button of selector 1350. In Home Mode, when the user is at home and the user's mobile device is connected to a home Wi-Fi network (e.g., via a local router 103), the same network on which the device 10 is connected, the air conditioner can be controlled without the need of Internet accessibility. In Home Mode, the user selects the "local" button of selector 1350. In some embodiments, data about Wi-Fi Direct Mode and/or Home Mode commands is locally saved in a mobile app database on the user's mobile device 60, and when the mobile device is linked to the Internet (e.g., via a cellular data connection), the data is transferred to the cloud 50 to keep the user's database updated for optimized statistics. In Cloud Mode, the device takes advantage of Internet connectivity (at the device 10 and the user's computing device) to allow the user to control an appliance such as the air conditioner over the Internet. In Cloud Mode, the user selects the "cloud" button of selector 1350. The user can connect to the desired appliance through Internet interface and Wi-Fi router 103, such as described above in connection with FIGS. 5A-5E. The data is communicated to and from the device through the cloud platform and local Wi-Fi router. The device uses onboard IR transceiver subsystem to send command data to associated appliance for appropriate actions. The data is logged in the database of cloud platform for effective user analytics. The device sends an acknowledgement to the user after it has conveyed the data to desired appliance through IR transceiver.

FIGS. 14A-14D are display diagrams illustrating implementations of user groups in accordance with some embodiments of the technology. The technology enables the creation, defining, and joining of families or groups of users to remotely control one or more appliances.

Figure 14A:
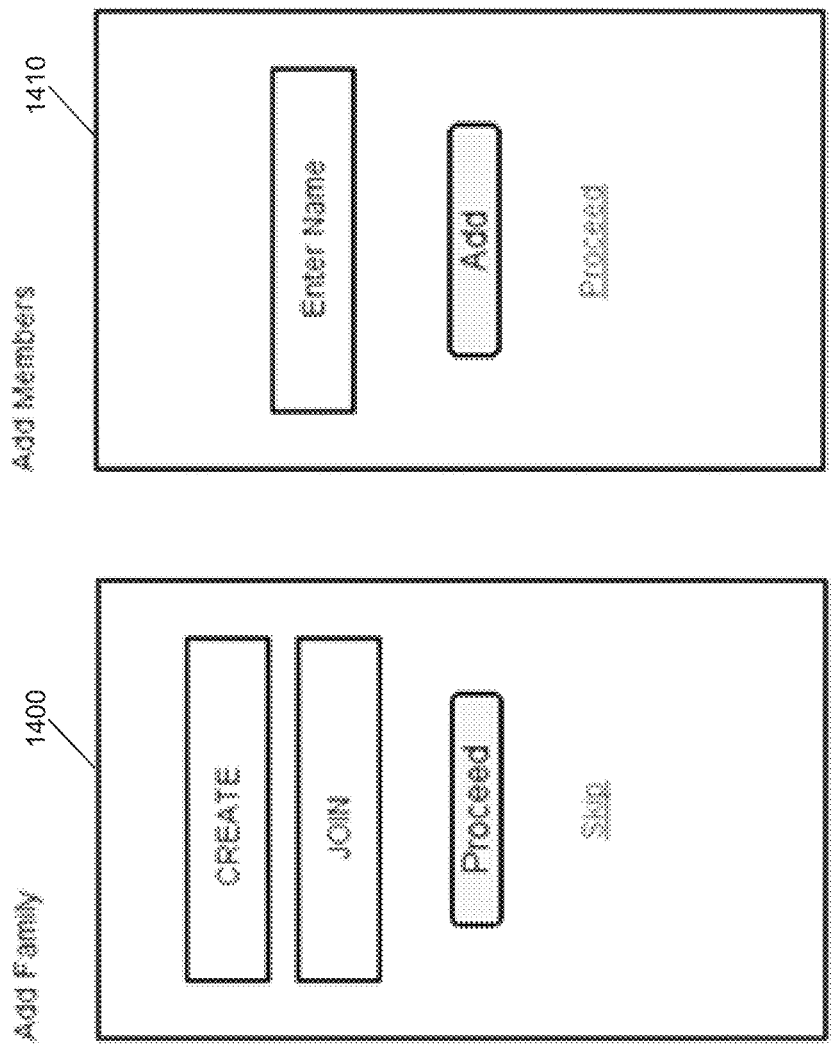
FIGS. 14A-14D are display diagrams illustrating implementations of user groups in accordance with some embodiments of the technology.

FIG. 14A shows example mobile application family registration options screens to add a family group 1400 and add a member to a family group 1410. A user has the option to create a new family group or join the existing group as a new member. The new member can have access to existing remote control devices associated with the family and can add a new device.

Figure 14B:
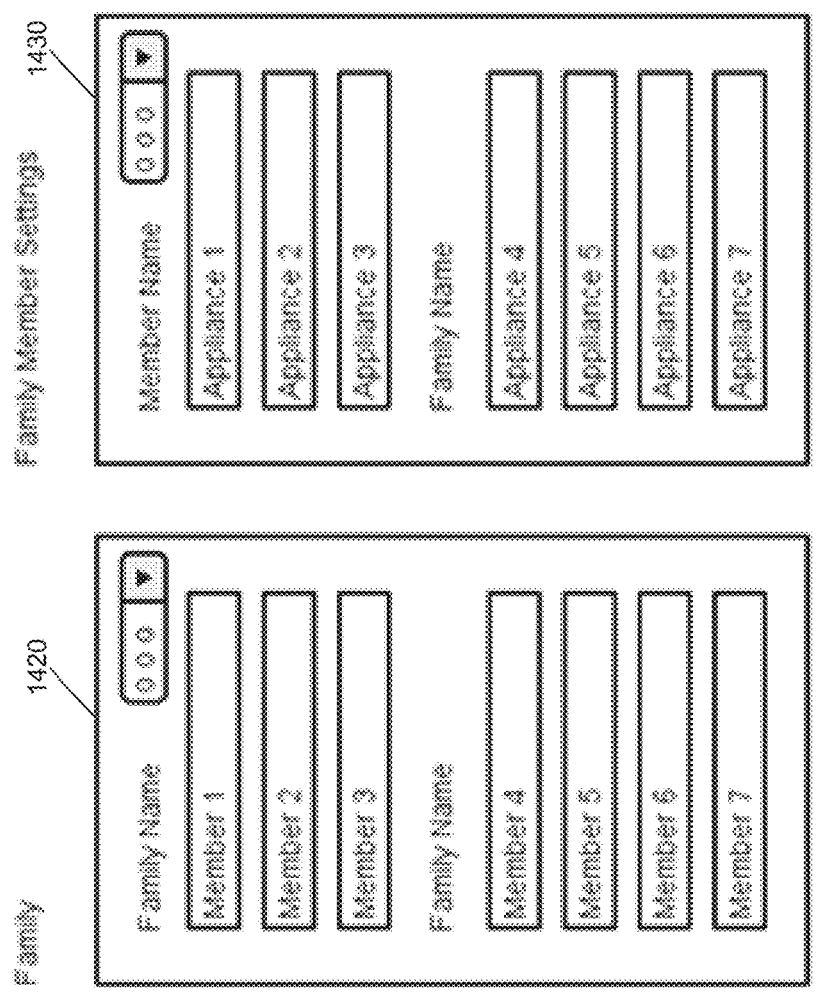

FIG. 14B shows example mobile application screens depicting members associated with a family group 1420, and family-associated appliances and member-associated appliances 1430. Screen 1420 displays a list of family groups and the members of each group. Screen 1430 displays a list of appliances associated with a specific family. In various embodiments, there can be more than one family registered and more than one device associated with each family. In some embodiments, one appliance can be associated with multiple users and/or multiple families, and one user can be associated with multiple families as well. Also, more than one appliance can be associated with each member of a family. The association of one or multiple devices to one or multiple members or families can be configured through these screens of the application.

Figure 14C:
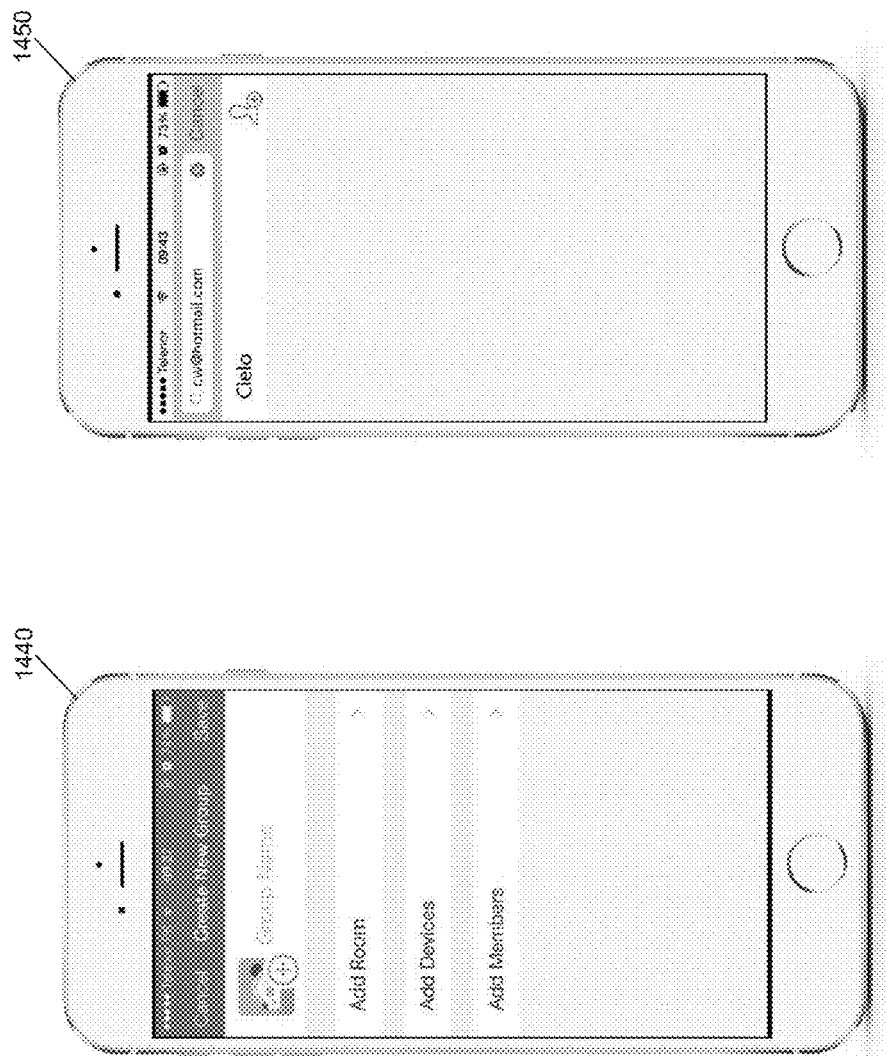
Figure 14D:
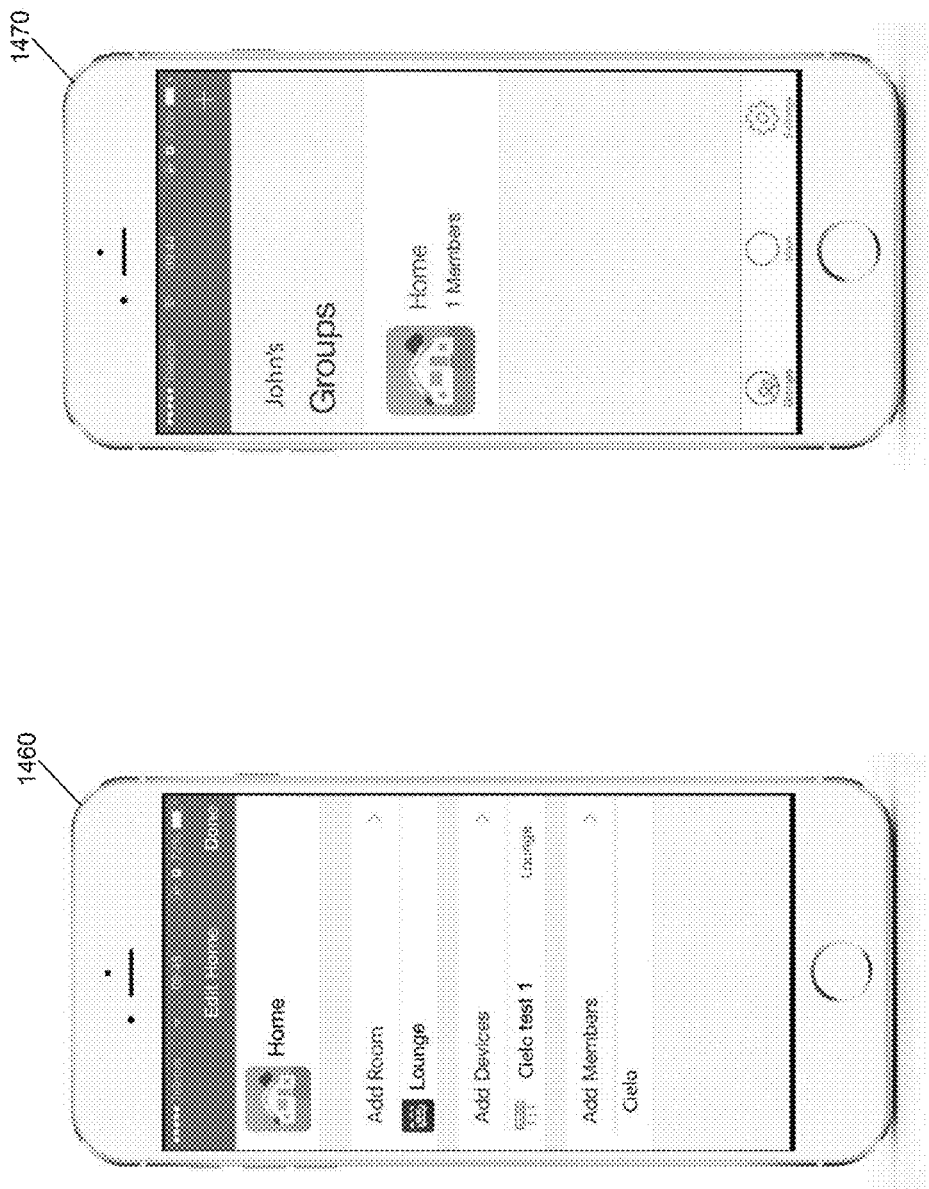

FIGS. 14C-14D illustrate another application graphical user interface to create a new family or join an existing family in accordance with some embodiments of the technology. The user has the option to link the device 10 with their available Wi-Fi router 103. The device 10 can be linked to one or multiple Wi-Fi routers in an order of priority if signals from multiple routers are available at the same location. The graphical user interface of the application offers the user to assign roles and rights for usage to various family members. The user(s) can set the schedulers, notifications and other functions as desired through the graphical user interface of the application. The application supports user groups and categories. For example, a user can make a "home" group and add rooms such as Bedroom, Lounge, Dining room, etc. as categories to it, and add an appliance such as an air conditioner to one or more of the groups.

FIG. 14C illustrates an interface to add a group at screen 1440, and to add a new member to a group by email address at screen 1450 to allow other users to control devices in the group. FIG. 14D illustrates a created group screen 1460 in which the user has chosen an icon and group name (e.g., Home, Office); selected one or more rooms (e.g., Washroom, Bedroom, Dining Room, Lounge, Office); and added devices to the group and to a room within the group. Screen 1470 shows that the user is a member of one "Home" group; a user can be a member of multiple groups. The group features of the technology enable coordinated control and management of multiple appliances in multiple locations.

Figure 15A:
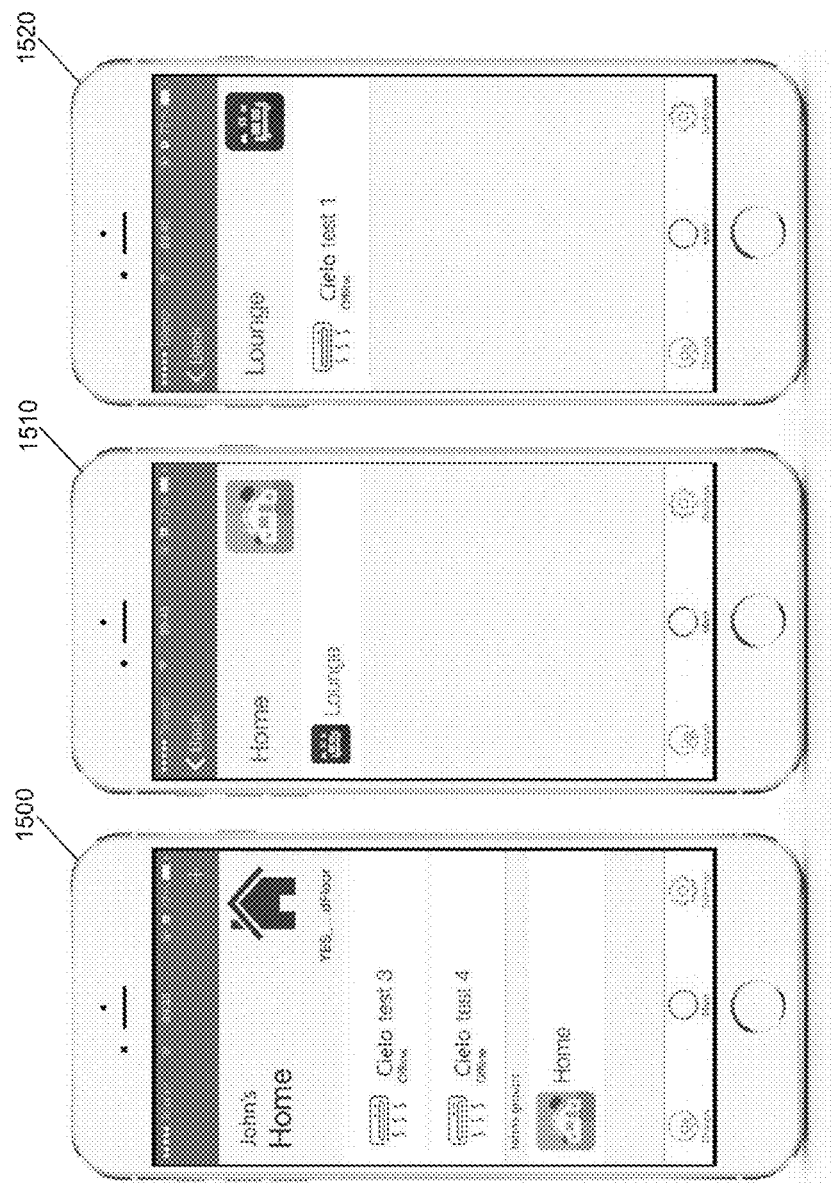
FIGS. 15A-15B are display diagrams illustrating main screens of a smartphone application in accordance with some embodiments of the technology.
Figure 15B:
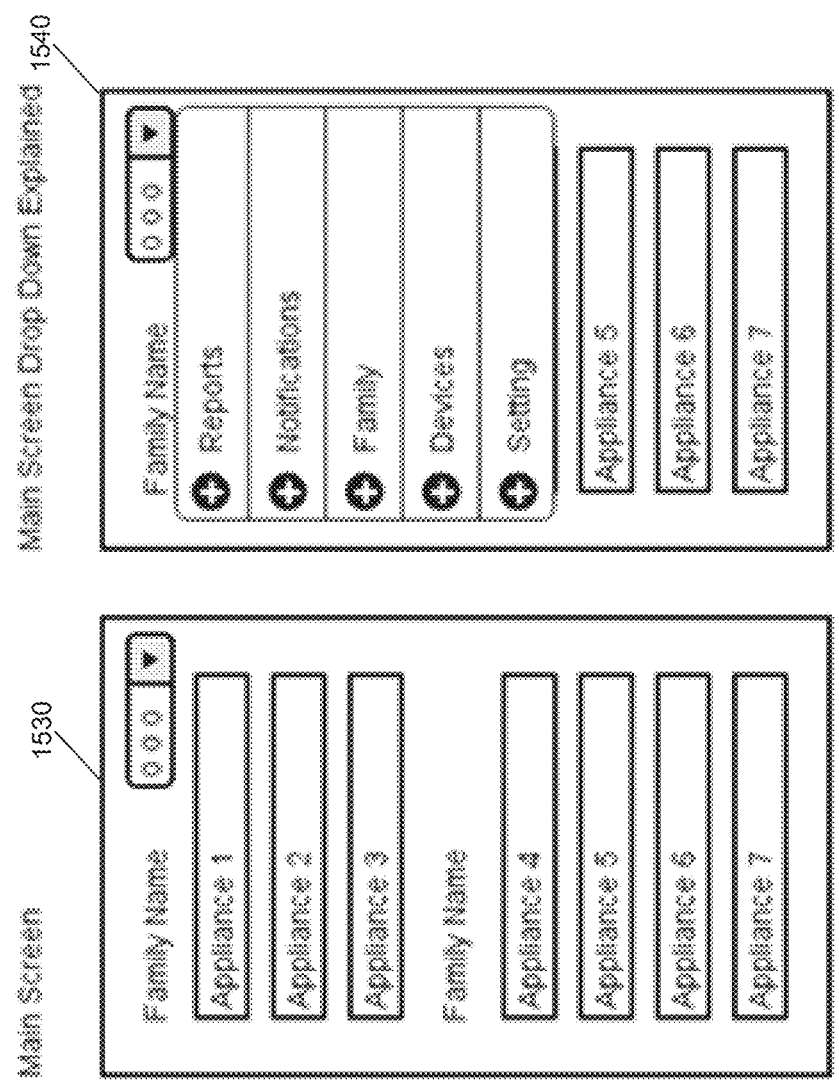

FIGS. 15A-15B are display diagrams illustrating main screens of a smartphone application in accordance with some embodiments of the technology. Screens 1500-1540 illustrate examples of a main screen and drop down options of a smartphone application including functions regarding reports, notifications, family/group, devices and settings. The home screen 1500 indicates that the mobile device is connected to a Wi-Fi network with the user's registered devices, specifically two air conditioner units, with their names and online/offline status shown. Screens 1510 and 1520 show devices organized by virtual folders matching physical locations in a home.

FIG. 15B shows example mobile application family-associated appliances 1530 and drop down options 1540 screens. A list of appliances associated with a specific family is shown. More than one family can be registered as well as more than one devices can be associated with each family. The options drop down menu gives user access to graphical reports, notifications, family information, associated devices information, and settings screens. In some embodiments, devices 10 are capable of FOTA firmware upgrades over the air. The mobile application main screen or a notification screen may communicate to the user that a new release of firmware is available or that an upgrade has been performed, e.g., with information of added or altered features. In some embodiments, the user can upgrade the firmware of the device through an interactive graphical user display of a smartphone application.

Figure 16A:
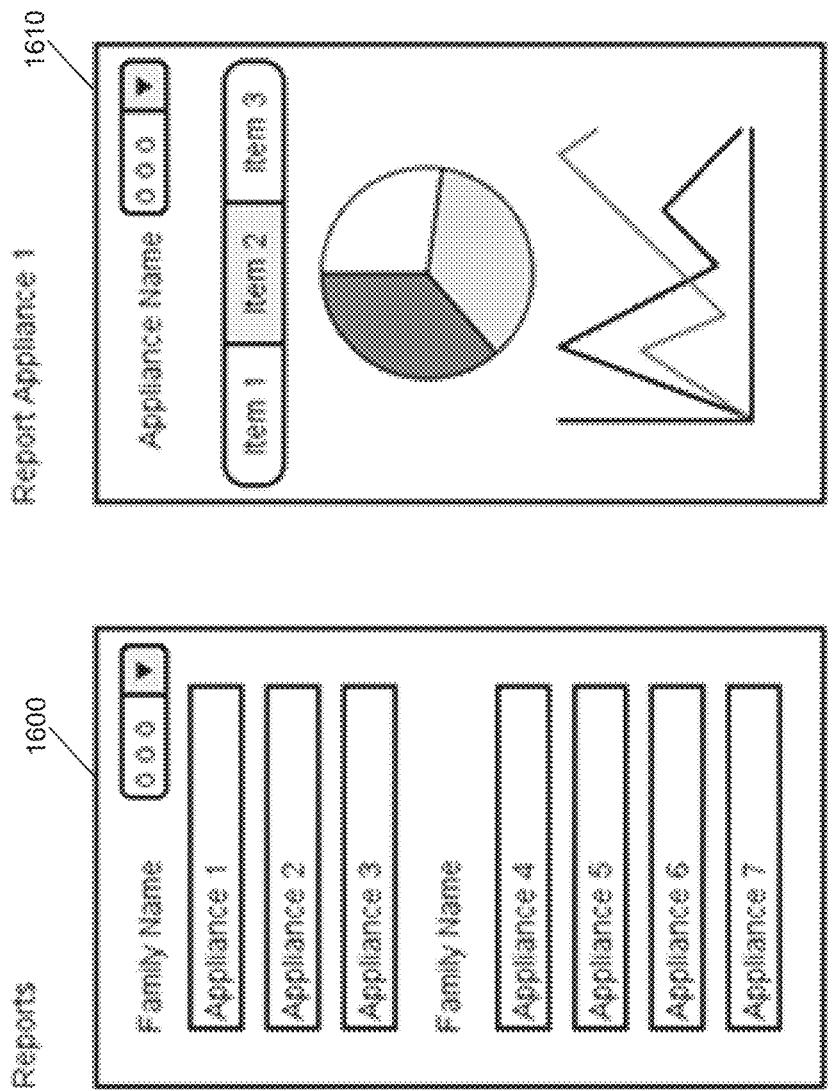
FIGS. 16A-16C are display diagrams illustrating reports about devices and appliances in accordance with some embodiments of the technology.
Figure 16B:
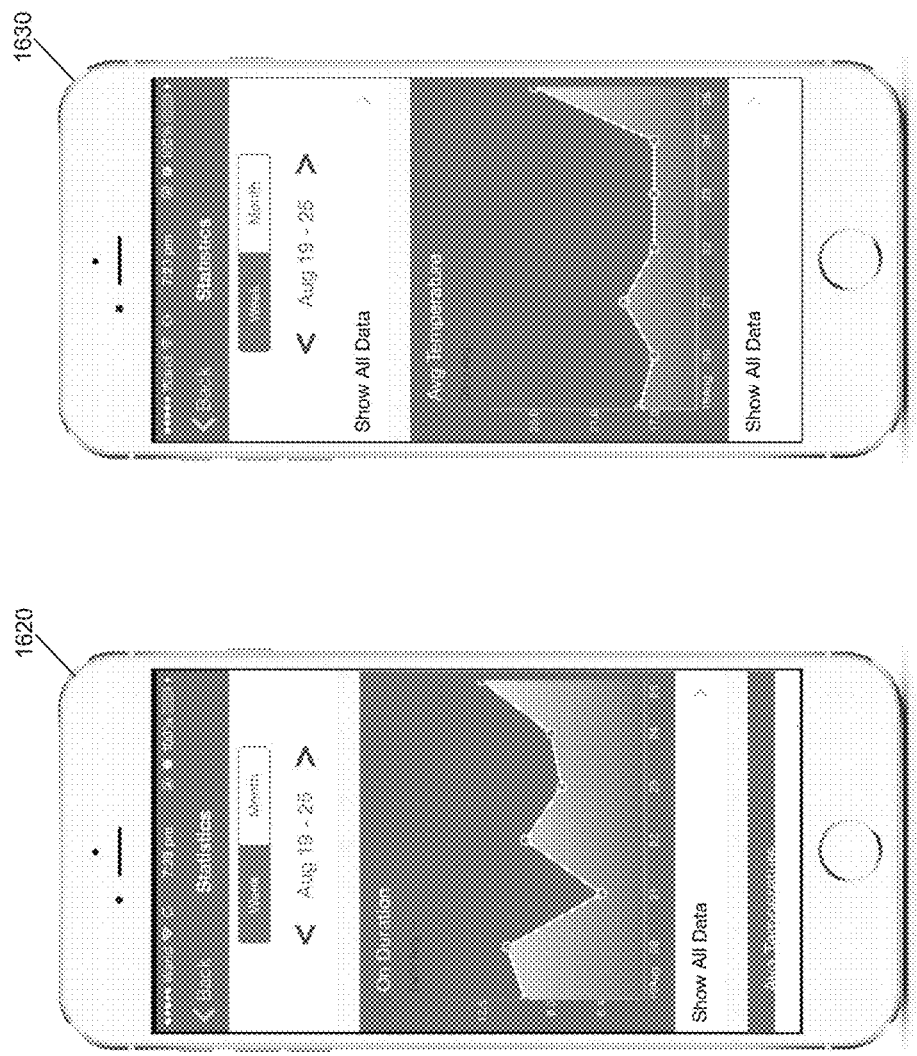
Figure 16C:
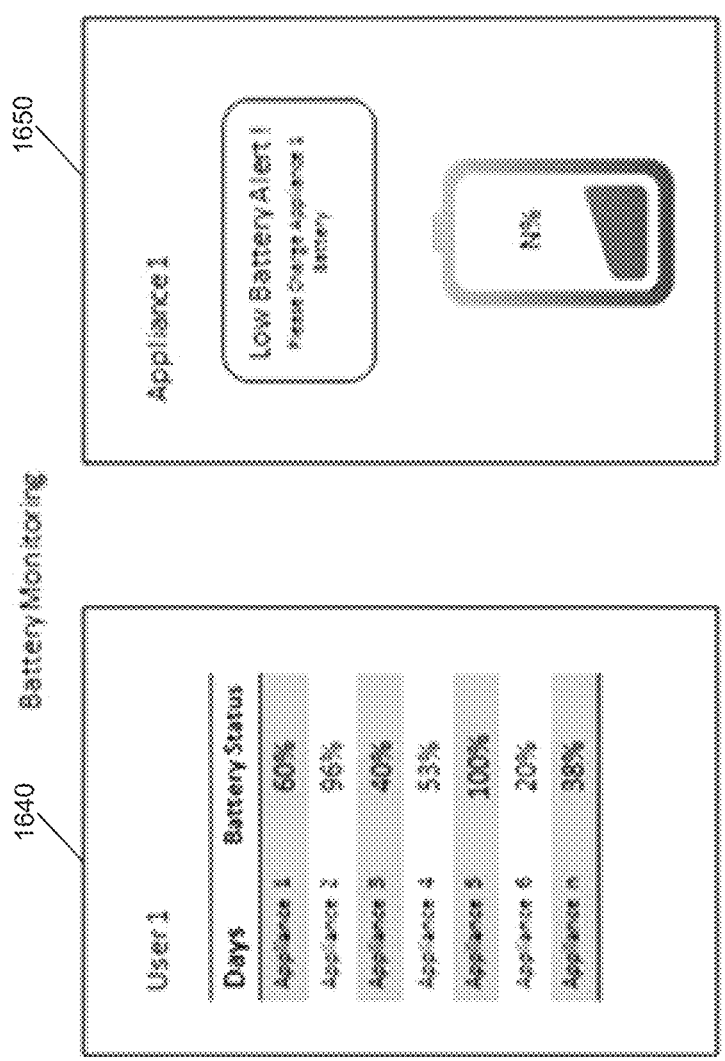

FIGS. 16A-16C are display diagrams illustrating reports about devices and appliances in accordance with some embodiments of the technology. Such reports can include, for example, graphical presentation of user analytics of logged data about appliance usage for user information; smartphone application screens presenting battery levels of various devices associated to the user; and device health status and related vital information.

FIG. 16A shows a mobile application family group with associated appliances screen 1600 and graphical reports of specific appliance screen 1610. The list of appliances associated with a specific family is shown in screen 1600; as described above in connection with FIGS. 14A-14D, there can be more than one family or other group registered and more than one device associated with each family or other group. The graphical reports 1610 related to an appliance can be, e.g., statistical usage or activity data in the form of graphs, charts and tables. In some embodiments, when single or multiple users assigned to multiple IR-enabled electric appliances through associated devices are off premises, the remote monitoring, management, and control of assigned appliances is offered to the user(s) remotely via the cloud through their smartphones.

FIG. 16B shows examples of air conditioner analytics screens 1620 and 1630. Duty cycle screen 1620 shows a line graph of air conditioner ON duration, showing how many hours on average an air conditioner was "ON" on a daily basis. Temperature screen 1630 shows the average temperature set at the air conditioner and/or observed by the device (e.g., while the air conditioner was "ON"), such as on a daily basis.

FIG. 16C shows example mobile application remote control device 10 battery monitoring screens 1640 and 1650. List screen 1640 shows a list of appliances or devices associated with a user and battery status in form of percentage in accordance with each appliance or device. When the device battery reaches a critical level (e.g., a predetermined voltage), an alert screen 1650 showing a graphical symbol of low battery power and a message alerts the user of the device's low battery state and advises the user to recharge or change batteries.

Figure 17A:
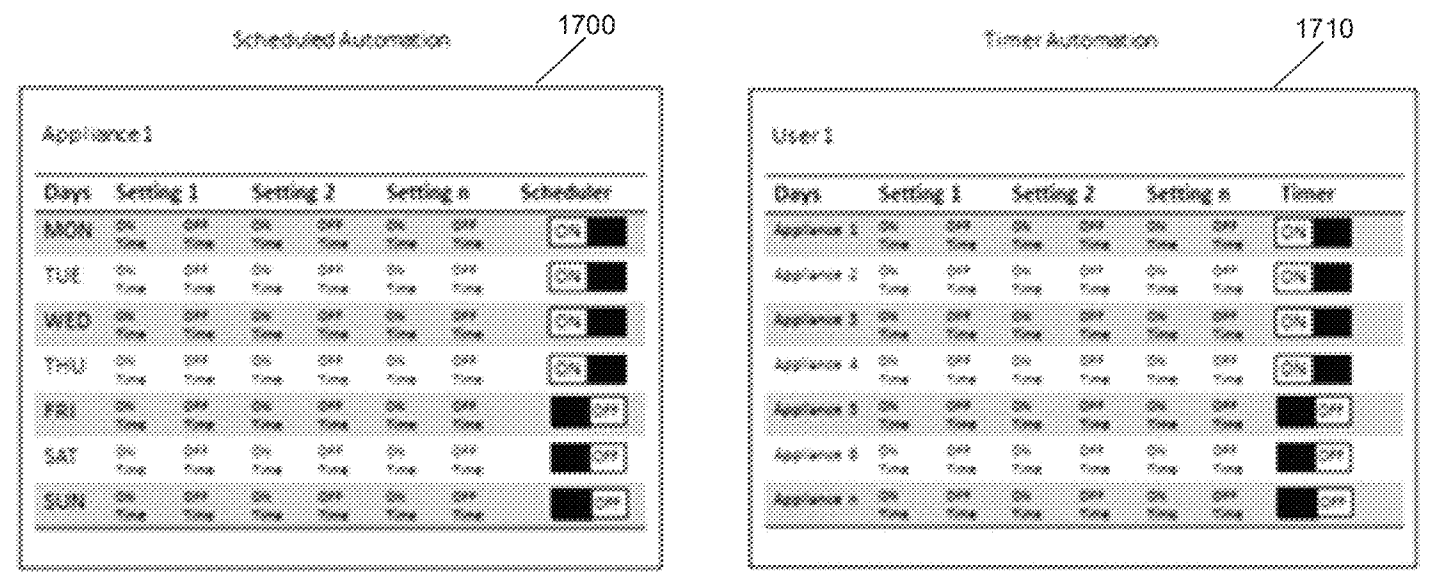
Figure 17B:
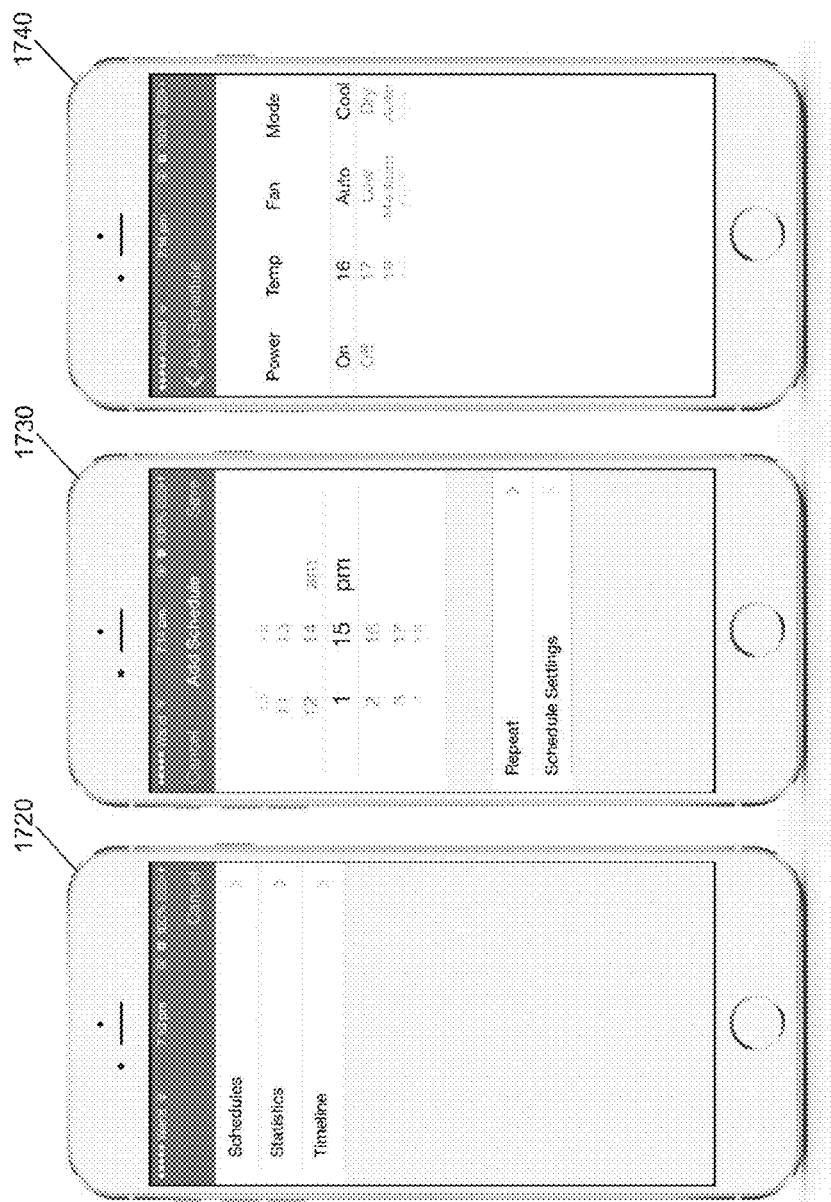

FIGS. 17A-17B are display diagrams illustrating appliance scheduling in accordance with some embodiments of the technology. The technology enables users to set schedules and automated timers for operating one or multiple appliances automatically, such as to have a home at a comfortable temperature when the occupants return home, or to operate lights and other appliances to make the house appear occupied and deter burglars while the occupants are away.

FIG. 17A shows example mobile application automatic timed and scheduled operation triggering screens. Scheduled automation screen 1700 shows the options of a particular device related to automatic triggering a number of user-specific appliance settings over the days of a week. The scheduler can be turned on or off in variable days of the week. Timer automation screen 1710 shows the options of a particular user related to automatically triggering a number of user-specific appliance settings over all the associated user appliances. The timer can be turned on or off for various appliances.

FIG. 17B illustrates another interface for scheduling for an air conditioner, enabling the user to set specific functions of the air conditioner to be performed over time. Various air conditioner functions (e.g., power on/off, temperature setting, mode, fan speed, etc.) can be performed as scheduled events or on a repeating schedule, for example.

In various embodiments, the technology includes a "Schedule Protocol" by which schedules that are added by any user against any device 10 are also sent to the device 10 via the cloud platform 50. In some embodiments, the cloud platform 50 sends a fixed number of schedules or schedule events to the device to be executed after processing along with data string and timestamp, and stores the remaining schedules or schedule events as a queue in its database. The device 10 sends an acknowledgment for each schedule information. When the schedule is executed, the device 10 sends a schedule execute acknowledgement to the cloud platform 50 along with the timestamp information of that schedule. The cloud platform 50 marks that schedule as completed and then gets pending schedules and sends them to the device 10.

Figure 18:
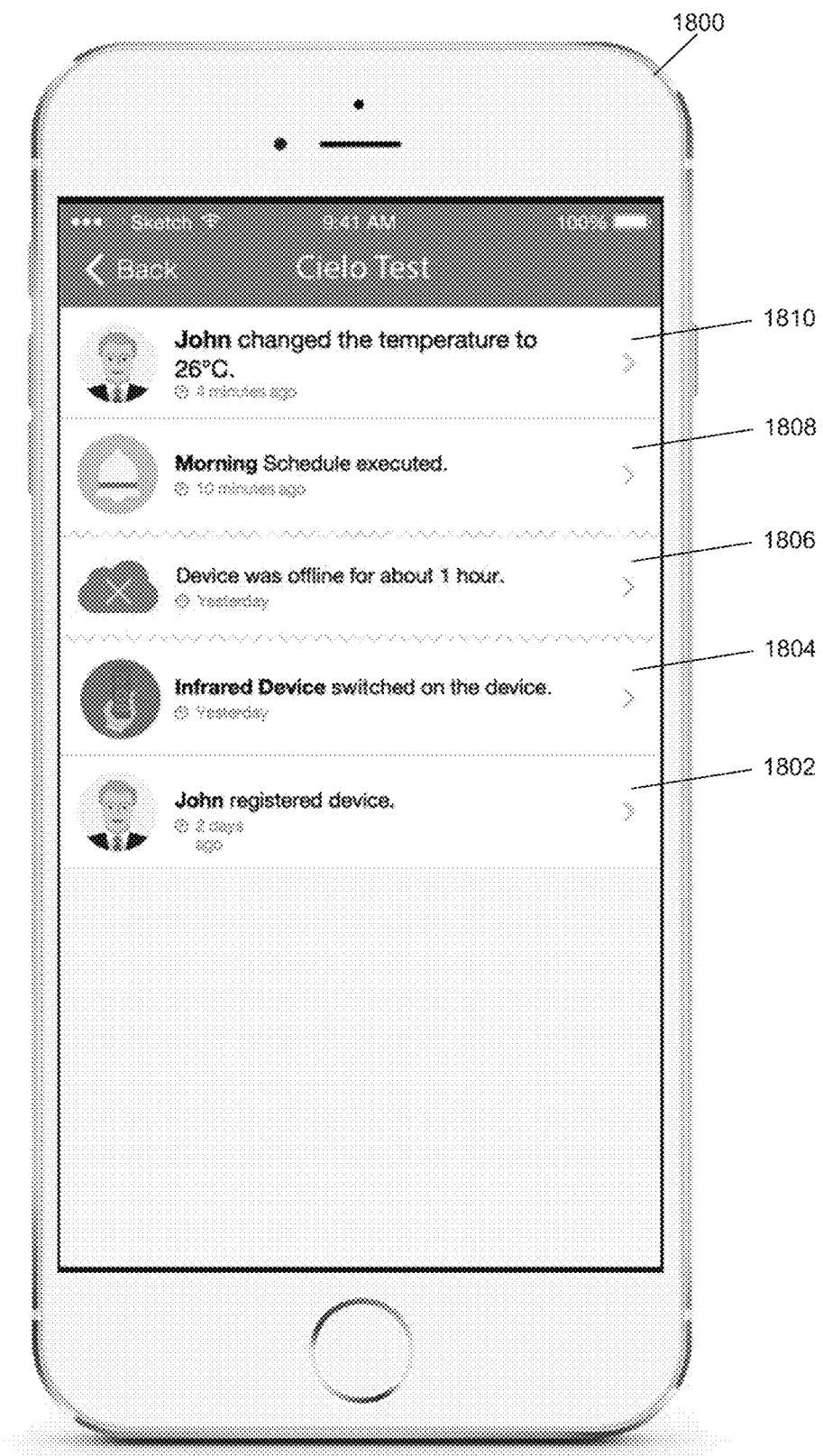
FIG. 18 is a display diagram illustrating a timeline screen in accordance with some embodiments of the technology.

FIG. 18 is a display diagram illustrating a timeline screen in accordance with some embodiments of the technology. The illustrated timeline screen 1800 enables a user to see all the actions performed and observed through the device 10 for a controlled appliance 20 such as an air conditioner, providing a complete audit trail. Starting at the bottom of the screen, the oldest item 1802 in the timeline 1800 history is that user 30 John registered the device 10, two days ago. Item 1804 indicates that an infrared device such as the air conditioner's own remote control turned on the air conditioner. In some embodiments, the technology detects, captures, and reports infrared signals received from legacy remote controls. In some embodiments, the technology is integrated into an appliance and captures information about external actions such as manual or infrared remote activation received by the appliance. In item 1806, the device 10 reports information about status of the device or the appliance, noting that the device was offline for about an hour the previous day. In item 1808, the timeline 1800 states that a schedule labeled "Morning" was executed ten minutes ago. And in item 1810, the timeline 1800 records that the user John set the temperature to 26 degrees Celsius. In some embodiments, the technology provides auditing functions based on observed timeline events, such as an alert that a particular user activated an appliance outside normal hours, or a notification that temperatures in a room exceed a threshold.

In various embodiments, the device 10 has onboard temperature and humidity sensors to measure environmental conditions in real time. The data is sent back to the cloud platform 50 for storage, analysis and statistics. The same data is used by the device 10 and onboard intelligent algorithms in conjunction with user controls data to learn about usage styles, usage behavior and implementation of smart control features in the device. Initially, the device operates as per the user instructions without taking any automated decisions and enters a learning mode. With the increased data in the database and having learnt about user life style and usage behavior, the technology can offer the user (e.g., by presenting a prompt to the user via a mobile or web application 61) to enable smart control. If a user enables the smart control, the device 10 takes intelligent decisions to offer optimized convenience and control to the user, reducing user hassle. For example, the technology can automatically adapt to user patterns or habits, such as adjusting room temperatures each morning according to temperature and time curve analysis. Additionally, smart learning can reduce the amount of time that the compressor of an air conditioner is used to save a considerable amount of energy for a user and money savings on the electricity bills of the users.

CONCLUSION

It will be appreciated by those skilled in the art that the above-described technology may be straightforwardly adapted or extended in various ways. For example, the technology may be implemented in devices of various sizes and forms, as standalone devices or integrated or retrofitted into appliances. While the foregoing description makes reference to particular embodiments, the scope of the invention is defined solely by the claims that follow and the elements recited therein.

The invention claimed is:

1. A cloud-enabled remote control device controlling one or more for infrared ("IR") enabled appliances, the device comprising:
   a processor coupleable to a power source;
   memory coupled to the processor;
   an IR transceiver assembly coupled to the processor and configured to send a signal to the one or more IR enabled appliances;
   a Wi-Fi module coupled to the processor;
   an environmental sensor assembly coupled to the processor;
   as housing containing the processor, the memory, the IR transceiver, the Wi-Fi module, and the environmental sensor;
   wherein the processor receives a trigger via the Wi-Fi module, identifies a user associated with the trigger, determines a user-specific operation based at least in part on stored user-specific operation configuration, and transmits a signal via the IR transceiver, the signal being based at least in part on the user-specific operation.

2. The remote control device of claim 1 wherein the IR transceiver assembly comprises a plurality of IR transceivers oriented in different directions, such that a combination of the plurality of IR transceivers are substantially omnidirectional.

3. The remote control device of claim 1 wherein the IR transceiver assembly comprises an IR emitter and an IR receiver.

4. The remote control device of claim 1 wherein the environmental sensor assembly comprises at least temperature, humidity, and ambient light sensors.

5. The remote control device of claim 1, further comprising a status indicator LED or display coupled to the processor.

6. The remote control device of claim 1 wherein the memory is configured to store computer-executable instructions configured to receive appliance control commands via the Wi-Fi module, and to transmit IR signals to control operation of an appliance via the IR transceiver.

7. The remote control device of claim 1 wherein the device is configured to control a plurality of appliances.

8. The remote control device of claim 1 wherein the memory is configured to store schedule information, and wherein the device is further configured to transmit IR signals to control operation of an appliance via the IR transceiver at scheduled times based on the stored schedule information.

9. The remote control device of claim 1 wherein the memory is configured to store information about each operation of the appliance and information about the status of the device.

10. The remote control device of claim 1 wherein the device is configured to communicate with a remote server via the Wi-Fi module.

11. The remote control device of claim 10 wherein the device is configured to obtain, from the remote server, appliance IR control codes.

12. The remote control device of claim 10 wherein the device is configured to transmit, to the remote server, information about each operation of the appliance and information about the status of the device.

13. The remote control device of claim 10 wherein the device is configured to receive, from a user-operated remote control, IR signals to the appliance, and wherein the device is further configured to transmit, to the remote server, information about the received IR signals.

* * * * *